(12) United States Patent
Tourapis et al.

(10) Patent No.: US 12,075,093 B2
(45) Date of Patent: *Aug. 27, 2024

(54) MEDIA OBJECT COMPRESSION/DECOMPRESSION WITH ADAPTIVE PROCESSING FOR BLOCK-LEVEL SUB-ERRORS AND/OR DECOMPOSED BLOCK-LEVEL SUB-ERRORS

(71) Applicant: Apple Inc., Cupertino, CA (US)

(72) Inventors: Alexandros Tourapis, Los Gatos, CA (US); Hye-Yeon Cheong, Los Gatos, CA (US); David William Singer, San Francisco, CA (US); Dominik Mehlem, Rheinbach (DE)

(73) Assignee: Apple Inc., Cupertino, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/951,792

(22) Filed: Sep. 23, 2022

(65) Prior Publication Data

US 2023/0009225 A1 Jan. 12, 2023

Related U.S. Application Data

(63) Continuation of application No. 17/127,921, filed on Dec. 18, 2020, now Pat. No. 11,496,770.

(Continued)

(51) Int. Cl.
*H04N 19/66* (2014.01)
*H04N 19/147* (2014.01)
*H04N 19/176* (2014.01)
*H04N 19/19* (2014.01)
*H04N 19/61* (2014.01)

(Continued)

(52) U.S. Cl.
CPC .......... *H04N 19/66* (2014.11); *H04N 19/147* (2014.11); *H04N 19/176* (2014.11); *H04N 19/19* (2014.11); *H04N 19/61* (2014.11); *G06T 7/11* (2017.01); *G06T 7/12* (2017.01)

(58) Field of Classification Search
CPC .............. H04N 19/124; H04N 19/176; H04N 19/563; H04N 19/186; G06K 9/00711; G06K 2209/01
See application file for complete search history.

(56) References Cited

U.S. PATENT DOCUMENTS 9,351,007 B1 * 5/2016 Hobbs .................. H04N 19/102
11,496,770 B2 11/2022 Tourapis et al.
(Continued)

*Primary Examiner* — Richard T Torrente
(74) *Attorney, Agent, or Firm* — Fish & Richardson P.C.

(57) ABSTRACT

A system comprises an encoder configured to compress media objects using a compression loop that includes a residual decomposition component that decomposes a residual signal for a block of the media object being compressed into multiple sub-error signals. The encoder is further configured to enable different transformation and/or quantization processes to be specified to be applied to different ones of the sub-errors. A corresponding decoder is configured to apply inverse transformation/quantization processing to the sub-error signals, based on the transformation/quantization processes that were applied at the encoder. The decoder then re-creates a residual signal from the processed sub-error signals and uses the re-created residual signal to correct predicted values at the decoder.

19 Claims, 17 Drawing Sheets

Related U.S. Application Data

(60) Provisional application No. 62/950,903, filed on Dec. 19, 2019.

(51) Int. Cl.
    *G06T 7/11*         (2017.01)
    *G06T 7/12*         (2017.01)

(56) References Cited

U.S. PATENT DOCUMENTS

| | | | | |
|---|---|---|---|---|
| 2010/0124274 A1* | 5/2010 | Cheok | .................. | H04N 7/18 |
| | | | | 375/E7.125 |
| 2014/0307780 A1* | 10/2014 | Cohen | .................. | H04N 19/119 |
| | | | | 375/240.03 |
| 2016/0205409 A1* | 7/2016 | Park | .................. | H04N 19/176 |
| | | | | 375/240.12 |
| 2018/0367782 A1* | 12/2018 | Ikai | .................. | H04N 13/128 |
| 2021/0195246 A1 | 6/2021 | Tourapis et al. | | |
| 2021/0329241 A1* | 10/2021 | Lim | .................. | H04N 19/70 |

\* cited by examiner

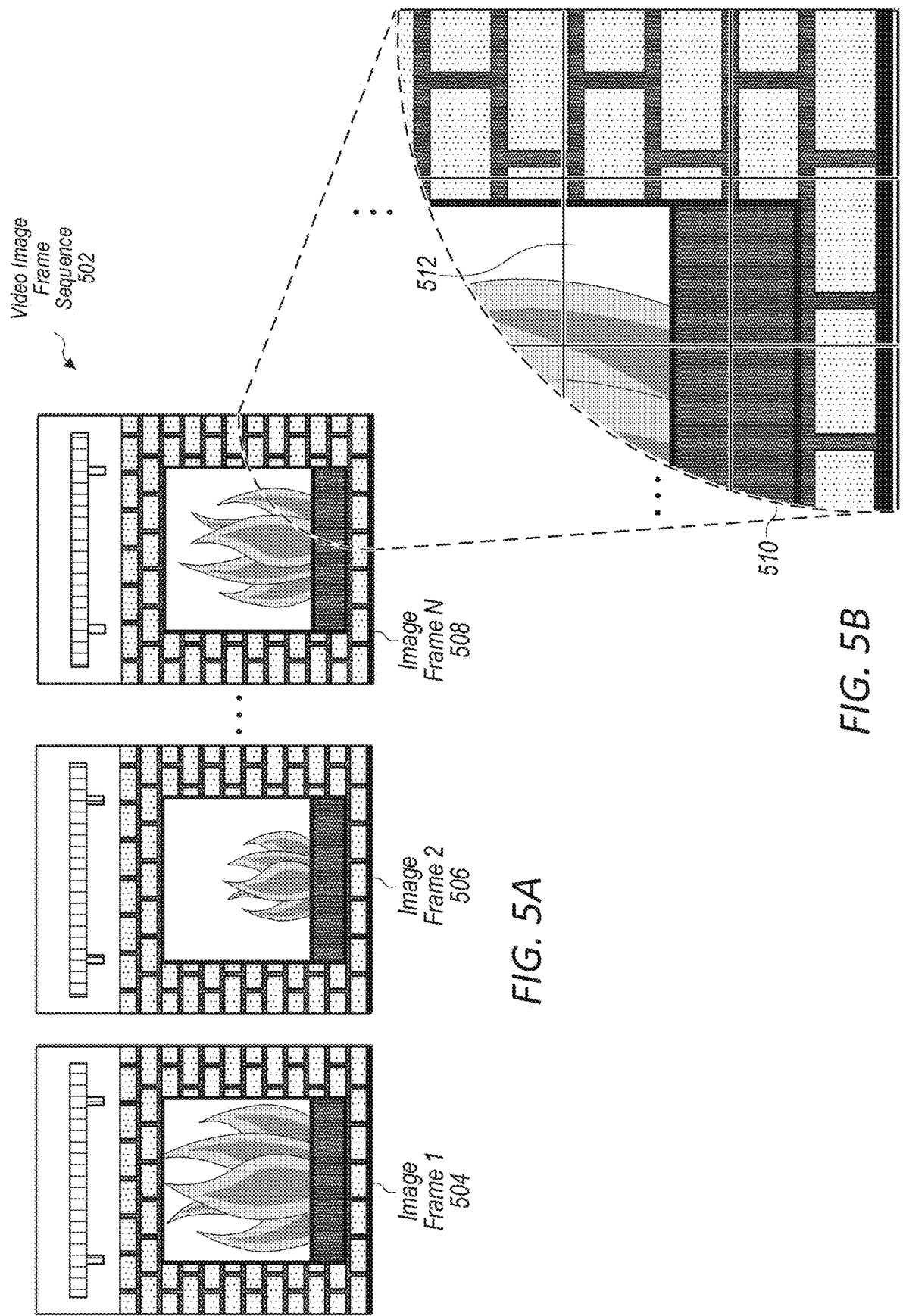

Decomposition via Edge Extraction into Edges and Non-Edges

Decomposition via Edge Extraction to Extract Edges as Separate Signals

Decomposition via Extraction of Certain Textures to Separate Out Specific Textures Decomposition via Extraction of Certain Colors to Separate Out Specific Colors

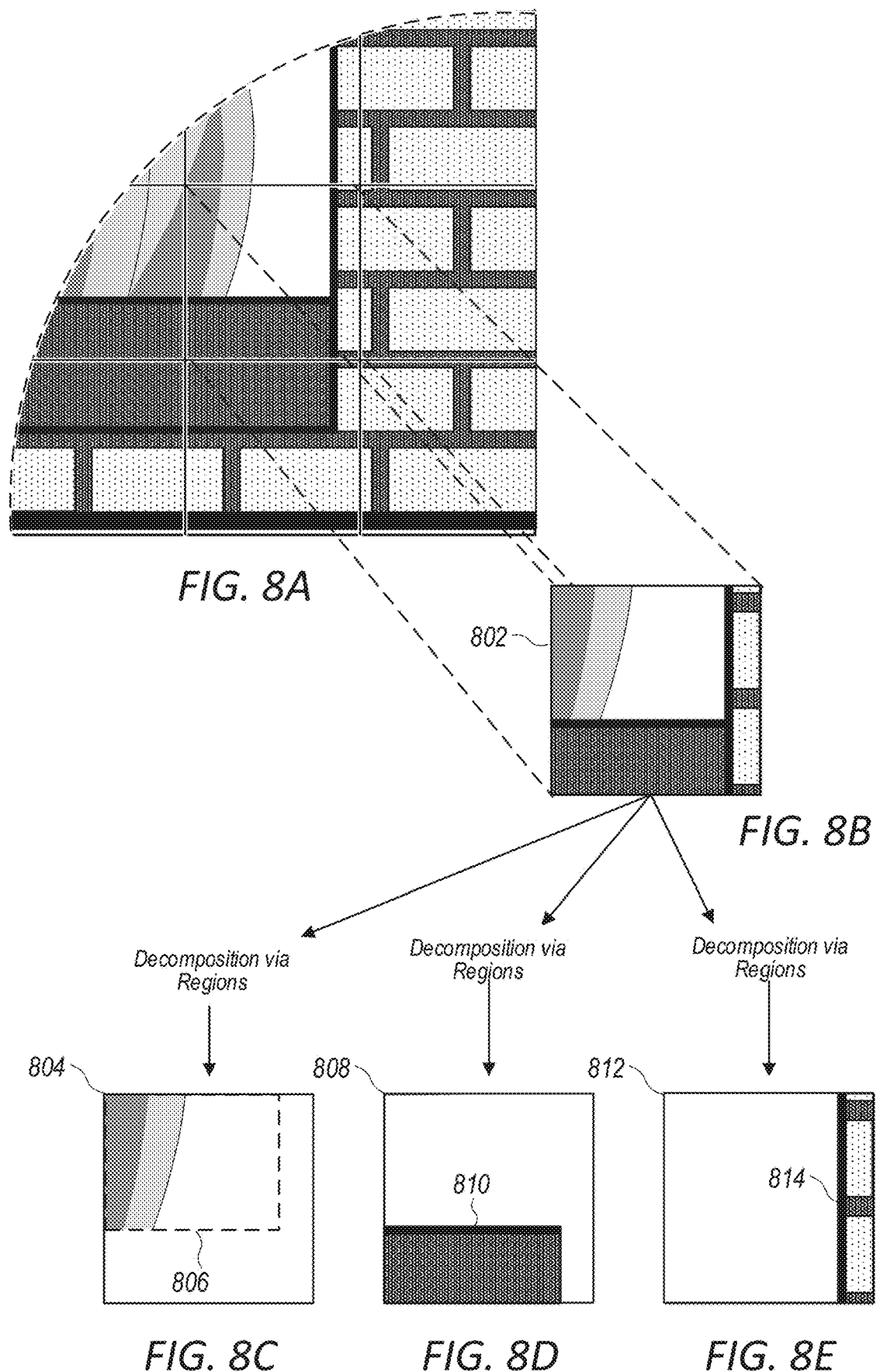

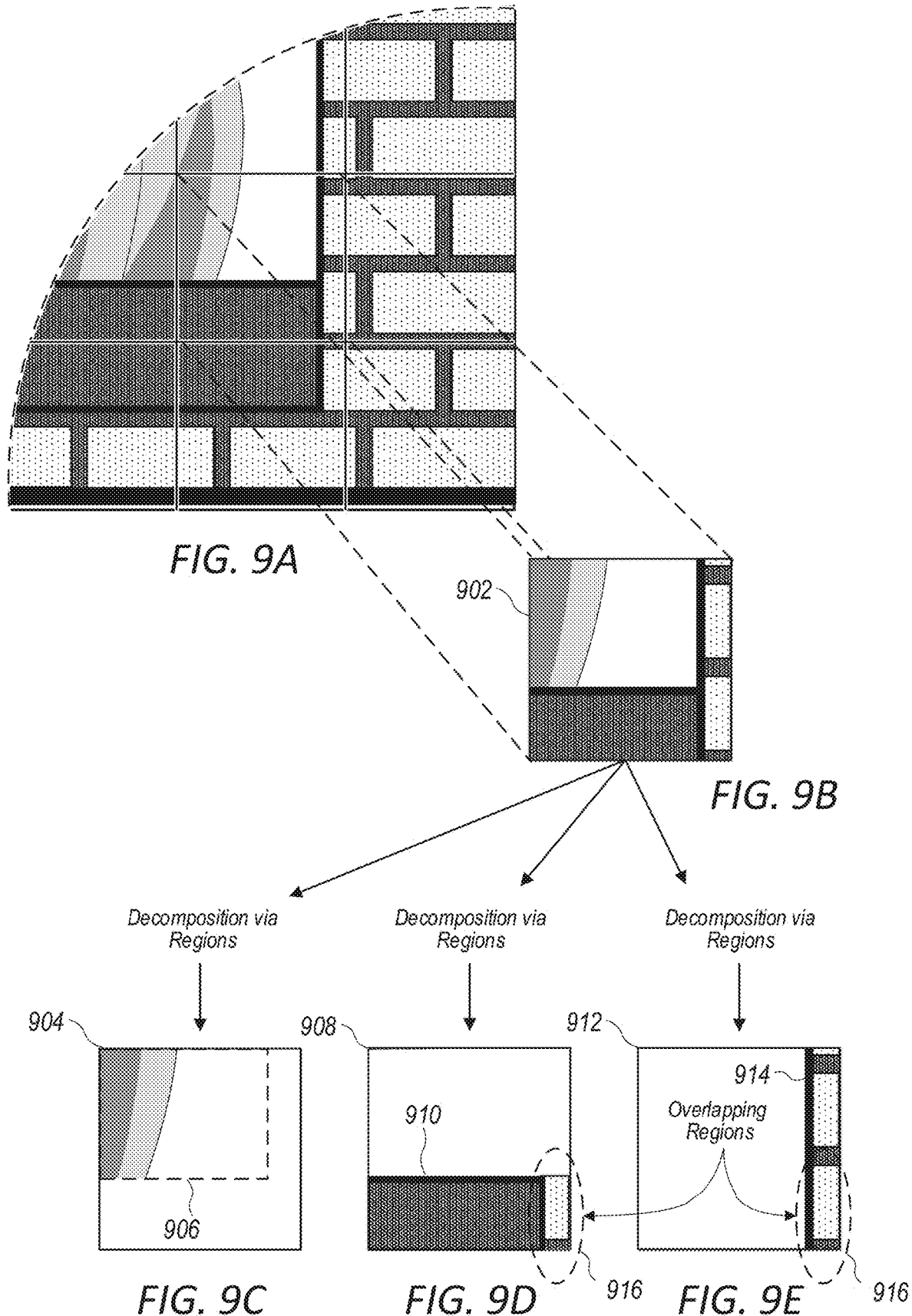

|  | Transform to be Applied | Quantization to be Applied | Weighting Factor |
|---|---|---|---|
| 1102 — Sub-error 1 | Discrete Sine Transform (DST) | Uniform Quantization | 0.6 |
| 1104 — Sub-error 2 | Discrete Cosine Transform (DCT) | Non-uniform Quantization | 0.2 |
| ⋮ | ⋮ | ⋮ | ⋮ |
| 1106 — Sub-error N | Fourier Transform | Dead-Zone Quantization | 0.1 |

FIG. 11

|  | Transform to be Applied | Quantization to be Applied | Weighting Factor |
|---|---|---|---|
| 1202 — Sub-error 1 | 1 | X | 0.6 |
| 1204 — Sub-error 2 | 2 | Y | (half previous) |
| ⋮ | ⋮ | ⋮ | ⋮ |
| 1206 — Sub-error N | 1 | Z | (half previous) |

1210

| Transform Index | 1 | 2 | 3 | 4 | ... |
|---|---|---|---|---|---|
|  | DST | DCT | Fourier | Taylor | ... |

1220

| Quantization Index | X | Y | Z | ... |
|---|---|---|---|---|
|  | Uniform | Non-uniform | Dead-Zone | ... |

FIG. 12

Higher Level General Parameter Signaling

| | | General Matrix |
|---|---|---|
| 1302 | Group Of Frames / Image / Prediction Unit 1 | 1 |
| 1304 | Group Of Frames / Image / Prediction Unit 2 | 2 |
| | ⋮ | ⋮ |
| 1306 | Group Of Frames / Image / Prediction Unit N | N |

*FIG. 13A*

Lower Level Particular Block Parameter Signaling

| | | Particular Matrix |
|---|---|---|
| 1308 | Image 1   Block X | 2 |
| 1310 | Image 2   Block Y | 1 |

*FIG. 13B*

*Example Quantization/ Transformation Matrix 1*

| | Transform | Quantization | Weight |
|---|---|---|---|
| 1312 Sub-error 1 | DST | Uniform | # of 1- sub-errors / 10 |
| Sub-error Z | If Condition 1, DCT; Otherwise DST | If DST Uniform; If DCT Non-uniform | # of Prev. -sub-errors / 10 |
| ⋮ | ⋮ | ⋮ | ⋮ |
| Sub-error W | If Condition 2,X; If Condition 3,Y; Otherwise Z | If Condition 3,C; Otherwise D | ⋮ |

*FIG. 13C*

*Example Quantization/ Transformation Matrix 2*

| | Transform | Quantization | Weight |
|---|---|---|---|
| 1318 Sub-error 1 | If Condition A, X; If Condition B, Y | If Condition 1, A | Formula 1 |
| Sub-error Z | If Condition C, Z | If Condition 2, B | Formula 2 |
| ⋮ | ⋮ | ⋮ | ⋮ |
| Sub-error W | If Condition B, W | If Condition 3, C | Formula 3 |

*FIG. 13D*

MEDIA OBJECT COMPRESSION/DECOMPRESSION WITH ADAPTIVE PROCESSING FOR BLOCK-LEVEL SUB-ERRORS AND/OR DECOMPOSED BLOCK-LEVEL SUB-ERRORS

PRIORITY

This application claims priority to and the benefit of U.S. patent application Ser. No. 17/127,921, filed Dec. 18, 2020, which claims priority to and the benefit of U.S. Provisional Patent Application No. 62/950,903, filed Dec. 19, 2019, the entire contents of which is incorporated herein by reference.

TECHNICAL FIELD

This disclosure relates generally to compression and decompression of media objects using adaptive processing of residual sub-errors and/or decomposed residual sub-errors at a block-level.

BACKGROUND

Various devices, including but not limited to personal computer systems, desktop computer systems, laptop and notebook computers, tablet or pad devices, digital cameras, digital video recorders, and mobile phones or smart phones, may include software and/or hardware that implement a media processing method. For example, a device may include an apparatus (e.g., an integrated circuit (IC), such as a system-on-a-chip (SOC), or a subsystem of an IC), that may receive and process digital video input from one or more sources and output the processed video information, e.g. pictures/frames or regions of a picture/frame, according to one or more video processing methods. As another example, a software program may be implemented on a device that may receive and process digital video input from one or more sources and output processed video frames according to one or more video processing methods.

In some video processing methods, to perform the processing, each input video picture/frame is divided into rows and columns of blocks of pixels (e.g., 16×16 pixel blocks). Each block of an input video picture/frame may be processed separately, and when done the processed blocks are combined to form the output video frame. This may be referred to as a block processing method.

A block processing method may include multiple processing steps or operations that are applied sequentially to each block in a video picture/frame.

SUMMARY

In some embodiments, a system for encoding media objects is configured to compress pixel value data for a plurality of images included in a plurality of frames, wherein as part of the compression, the system performs pixel value prediction at an image portion-level, determination of residual pixel values at the image-portion level, decomposition of the residual pixel values for the image portion into one or more sub-errors, also referred to as sub-residuals, and further processes the one or more sub-errors by applying a transformation and a quantization, wherein different transform functions and/or quantization functions/parameters/processes may be specified for the one or more respective sub-errors of an image portion, such as a block. In some embodiments, an encoder component may evaluate various decomposition options and determine whether or not decomposition should be performed for a residual error for an image portion, and may further determine how and into how many sub-errors the residual error for the image portion should be decomposed. Supported levels of granularity for an image portion may include a macroblock, Coded Tree Unit (CTU), Coding Unit (CU), Prediction Unit (PU), Transform Unit (TU), etc. or other block coding units that may be supported by a given coding technology. In some embodiments, techniques as described herein may be added as an extension to an existing video coding standard (e.g. in a new profile) or may be included in new video coding standards, such as MPEG VVC/H.266, AOMedia's AV2, or other such coding standards or technologies.

In some embodiments, a system is configured to encode media objects comprising video image data. The system includes one or more processors and one or more memories storing program instructions that, when executed on or across the one or more processors, cause the one or more processors to compress pixel value data for a plurality of images included in a plurality of frames of a video. To compress the pixel value data for respective blocks of respective ones of the frames of the video, the program instructions cause the one or more processors to predict pixel values for pixels of the block, wherein the pixel values are predicted based on pixel values of other pixels in the block or based on pixel values of a corresponding block in another frame of the video. The program instructions also cause the one or more processors to determine residual differences between the predicted pixel values for the pixels of the block and actual pixel values of the pixels of the block. Moreover, the program instructions cause the one or more processors to decompose the determined residual differences into one or more sets of sub-errors for the pixel values of the pixels of the block.

For example, for a given block, one or more filters or other extraction processes may be applied to decompose residual errors (e.g. differences between predicted pixel values and actual pixel values) for the block into sub-errors for the given block. For example, edges may be extracted such that the residual error signal for the given block is decomposed into an edges sub-error signal and a non-edges sub-error signal for the given block. As another example, the residual error signal for the given block may be decomposed by texture, color, etc. wherein different respective sub-error signals correspond to different textures, colors, etc. in the given block.

Also, the program instructions cause the one or more processors to apply a first set of processing parameters to a first set of the sets of sub-errors to modify the first set of sub-errors in accordance with the first set of processing parameters. Additionally, the program instructions cause the one or more processors to apply a second set of processing parameters to a second set of the sets of sub-errors to modify the second set of sub-errors in accordance with the second set of processing parameters. In such situations, the first and second set of processing parameters may comprise different processing parameters that result in different modifications of the first and second sets of sub-errors.

For example, in some embodiments, the processing parameters may include a transformation function, such as a discrete cosine transform, a discrete sine transform, a Fourier transform, a Taylor transform, a wavelet transform, a bandlet transform etc. In some embodiments, the processing parameters may include applying a quantization process to a transformed sub-error signal. For example, in the scenario wherein the residual error signal is decomposed into an edges sub-error signal and a non-edges sub-error signal, different transform functions and/or different quantization functions/parameters/processes may be applied to the edges sub-error signal and the non-edges sub-error signal. For example, it may be more desirable to apply weaker quantization parameters or a different transform function to the edges sub-error signal than the non-edges sub-error signal in order to retain crisp edges, as an example. As an example different quantizer values, step sizes, etc. may be applied to different sub-error signals. Also, different quantizer models may be applied to different sub-error signals, such as a linear quantizer model, a mid-rise quantizer model, a midtread quantizer model, quantizer models with different dead zones, etc.

Additionally, the program instructions cause the one or more processors to encode compressed pixel value data for the plurality of images of the video, wherein the compressed pixel value data comprises the first modified set of sub-errors and the second modified set of sub-errors, which have been modified by applying the transform function and the quantization parameters.

In some embodiments, one or more non-transitory computer readable media store program instructions, that, when executed on or across one or more processors, cause the one or more processors to receive compressed data for one or more media objects, wherein the compressed data comprises a first set of modified sub-errors and a second set of modified sub-errors for respective blocks of respective ones of the one or more media objects. To decompress/decode the compressed data for respective blocks of a respective one of the media objects, the program instructions cause the one or more processors to predict values for respective components of the block based on values of other components in the block or based on values of a corresponding block at another moment in time. Furthermore, the program instructions also cause the one or more processors to apply a first set of inverse processing parameters to a first set of modified sub-errors for the respective block; and apply a second set of inverse processing parameters to the second set of modified sub-errors for the respective block, wherein the first and second set of inverse processing parameters are different. Additionally, the program instructions cause the one or more processors to add a first set of sub-errors, resulting from applying the first set of inverse processing parameters to the received first set of modified sub-errors, to respective ones of the predicted values; and add a second set of sub-errors, resulting from applying the second set of inverse processing parameters to the received second set of modified sub-errors, to respective ones of the predicted values. The program instructions further cause the one or more processors to reconstruct the one or more media objects from the respective blocks to which the first and second sets of sub-errors have been added to the predicted values.

For example, for a given block of a media object being decoded/decompressed, the first set of modified sub-errors may include a set of edges sub-errors to which a transform function and quantization parameters have been applied at an encoder. Also, the second set of modified sub-errors may include a set of non-edges sub-errors to which a different transform function and/or different quantization parameters have been applied at the encoder. Thus, the program instructions for decompressing/decoding the received compressed data may cause respective different inverse transform functions and/or inverse quantization parameters to be applied separately to the respective separate sub-errors to re-create equivalent sub-errors as were determined at the encoder subsequent to decomposition and prior to applying the different transform functions and different quantization parameters. Additionally, the program instructions for decompressing/decoding the received compressed data may further cause the re-created sub-errors to be added together to form an equivalent residual signal as was determined at the encoder prior to decomposition. However, since the different sub-errors were processed differently, more important aspects of the residual signal may have been better preserved with less loss in the recreated residual signal than is the case for other aspects of the residual signal that may have been processed with different transform functions and/or different quantization functions. This may result in a better recreated image at the decoder and/or greater compression efficiency, in some embodiments.

In some embodiments, a device includes a display, one or more processors and one or more memories. The one or more memories store program instructions that, when executed on or across the one or more processors, cause the one or more processors to receive compressed pixel value data for one or more images, wherein the compressed pixel value data comprises a first set of modified sub-errors and a second set of modified sub-errors. For respective blocks of a plurality of blocks of respective ones of the plurality of images, the program instructions cause the one or more processors to: apply a first set of inverse processing parameters to the first set of modified sub-errors for the block; apply a second set of inverse processing parameters to the second set of modified sub-errors for the block, wherein the first and second set of inverse processing parameters are different. The program instructions also cause the one or more processors to predict pixel values for pixels for the block based on pixel values of other pixels in the block or based on pixel values of a corresponding block in another image of the one or more images. Additionally, the program instructions cause the one or more processors to add a first set of sub-errors, resulting from applying the first set of inverse processing parameters to the first set of modified sub-errors, to respective ones of the predicted pixel values; and add a second set of sub-errors, resulting from applying the second set of inverse processing parameters to the second set of modified sub-errors, to respective ones of the predicted pixel values. Additionally, the program instructions cause the one or more processors to reconstruct the one or more images from the respective blocks to which the first and second sets of sub-errors have been added to the predicted pixel values.

In some embodiments, at an encoder, the predicted pixel values combined with the respective sub-errors may further be processed by one or more in-loop filters included in a compression loop, such as a deblocking filter, sample adaptive offset (SAO) filter, adaptive loop filter (ALF), bilateral filter, or other in-loop filter. These further processed pixels may then be used as inputs to predict other pixel values.

In some embodiments, at a decoder, predicted pixel values combined with the re-created sub-errors may further be filtered by one or more in-loop filters included in a decompression loop, such as a deblocking filter, sample adaptive offset (SAO) filter, adaptive loop filter (ALF), bilateral filter, or other in-loop filter.

BRIEF DESCRIPTION OF THE DRAWINGS

FIG. 5A illustrates a set of image frames of a video, according to some embodiments.

FIG. 5B illustrates one of the image frames that has been partitioned into a plurality of blocks, according to some embodiments.

FIGS. 8A-E illustrate an example decomposition of residuals by region for a block into a plurality of sub-errors, according to some embodiments.

FIGS. 9A-E illustrate an example decomposition of residuals for a block by region, with overlapping regions to result in a plurality of sub-errors with that cover overlapping regions, according to some embodiments.

FIG. 11 illustrates an example of data that may be signaled to indicate transforms, quantizations, and weighting factors for separate sub-errors of a block, according to some embodiments.

FIG. 12 illustrates an example of data that may be signaled using one or more indexes known to an encoder and known to a decoder to specify transforms, quantizations, and weighting factors for separate sub-errors of a block, according to some embodiments.

FIGS. 13A-D illustrate an example of data that may be signaled using quantization matrices known to an encoder and known to a decoder to specify transforms, quantizations, and weighting factors for separate sub-errors of a block, according to some embodiments.

Figure 1:
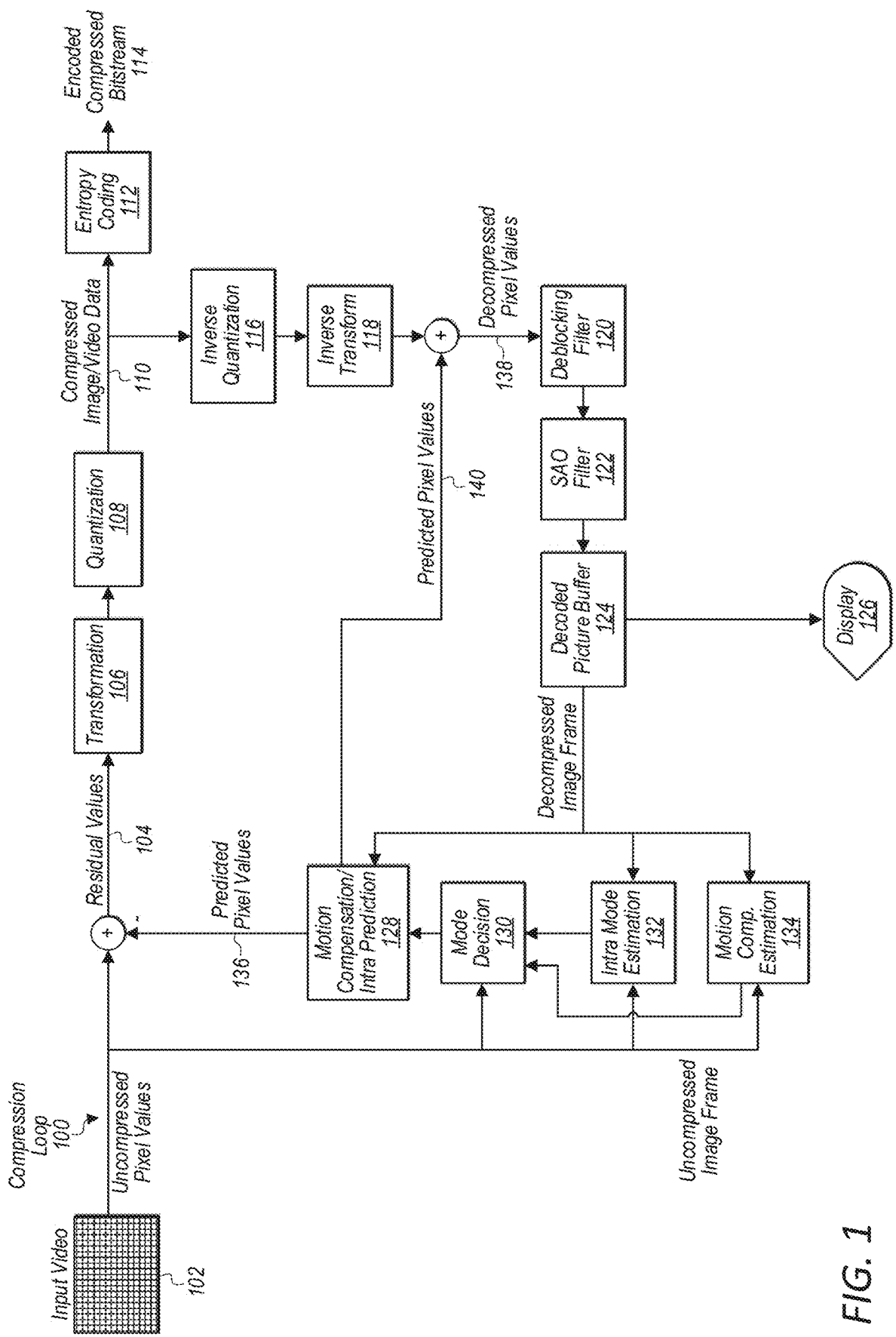
FIG. 1 illustrates an example video compression loop of an encoder, according to some embodiments.

This specification includes references to "one embodiment" or "an embodiment." The appearances of the phrases "in one embodiment" or "in an embodiment" do not necessarily refer to the same embodiment. Particular features, structures, or characteristics may be combined in any suitable manner consistent with this disclosure.

"Comprising." This term is open-ended. As used in the appended claims, this term does not foreclose additional structure or steps. Consider a claim that recites: "An apparatus comprising one or more processor units . . . ." Such a claim does not foreclose the apparatus from including additional components (e.g., a network interface unit, graphics circuitry, etc.).

"Configured To." Various units, circuits, or other components may be described or claimed as "configured to" perform a task or tasks. In such contexts, "configured to" is used to connote structure by indicating that the units/circuits/components include structure (e.g., circuitry) that performs those task or tasks during operation. As such, the unit/circuit/component can be said to be configured to perform the task even when the specified unit/circuit/component is not currently operational (e.g., is not on). The units/circuits/components used with the "configured to" language include hardware—for example, circuits, memory storing program instructions executable to implement the operation, etc. Reciting that a unit/circuit/component is "configured to" perform one or more tasks is expressly intended not to invoke 35 U.S.C. § 112(f), for that unit/circuit/component. Additionally, "configured to" can include generic structure (e.g., generic circuitry) that is manipulated by software and/or firmware (e.g., an FPGA or a general-purpose processor executing software) to operate in manner that is capable of performing the task(s) at issue. "Configure to" may also include adapting a manufacturing process (e.g., a semiconductor fabrication facility) to fabricate devices (e.g., integrated circuits) that are adapted to implement or perform one or more tasks.

"First," "Second," etc. As used herein, these terms are used as labels for nouns that they precede, and do not imply any type of ordering (e.g., spatial, temporal, logical, etc.). For example, a buffer circuit may be described herein as performing write operations for "first" and "second" values. The terms "first" and "second" do not necessarily imply that the first value must be written before the second value.

"Based On." As used herein, this term is used to describe one or more factors that affect a determination. This term does not foreclose additional factors that may affect a determination. That is, a determination may be solely based on those factors or based, at least in part, on those factors. Consider the phrase "determine A based on B." While in this case, B is a factor that affects the determination of A, such a phrase does not foreclose the determination of A from also being based on C. In other instances, A may be determined based solely on B.

DETAILED DESCRIPTION

Some processes, such as transformation functions and quantization functions may be applied to a media object during compression. However these processes are typically applied to a whole media object or applied to a whole block of the media object. For example, the same transformation function or the same quantization function/parameters/process may be applied to a whole image or a whole prediction block of an image. This may constrain flexibility to adjust processing parameters for certain aspects of the media object differently than for other aspects of the media object. For example, during a compression process and conversely during a decompression process the same transformation function and quantization function/parameters/process may be applied to all pixels of a given prediction block in the same way, regardless of the relative importance of the pixels.

For some types of media objects, such as video images, still images, audio files, etc. some aspects of a signal for a compressed version of the media object may have more importance when reconstructing the media object than other aspects of the signal. For example, compression/decompression losses or distortion in edges of an image in a given block of a media object may have more impact on the quality of a reconstructed image in the given block than losses or distortions of non-edge portions of the image in the given block.

In some embodiments, in order to provide flexibility to process different aspects of a given media object block differently, an encoder may include a residual decomposition module downstream of a module that determines, for the given block, residual differences between predicted values and corresponding values for the given block in an originally received media object that is being compressed. The decomposition module may decompose the residual signal into a plurality of sub-errors, each representing an error portion (e.g. difference between predicted and actual values) of the residual signal for an aspect of the residual signal. For example, for a given block, an overall residual signal may be decomposed into an edges sub-error component and a non-edges sub-error component. The edges sub-error component and the non-edges sub error component may sum to equal the residual signal. However, because the edges sub-error component has more importance in a reconstructed version of the given block, a particular transformation function and/or quantization parameters that introduce less losses or distortion may be selected to be used to compress the edges sub-error signal, whereas a different transformation function and/or different quantization parameters that yield greater compression efficiency may be selected to be used to compress the non-edges sub-error signal. The decomposition module may also determine that no decomposition is necessary and specify that only a single residual signal should be used.

Note that edges and non-edges are given as an example decomposition. In some embodiments, various other types of decomposition may be applied to a residual signal to decompose the residual signal into a plurality of sub-error signals. For example, other decompositions may decompose a residual signal based on textures, colors, regions in a block, etc.

In some embodiments, various different transformation functions may be selected to be applied to different respective sub-errors for a given block being compressed/encoded. For example, in some embodiments, available transformations that may be selected to be applied to a given sub-error component of a residual signal may include a discrete cosine transform (DCT), a discrete sine transform (DST), a Fourier transform (FT), a Taylor series transform, a wavelet or bandlet transform, etc. In some embodiments, various different quantization parameters and/or quantization functions may be selected at an encoder to be applied to different respective sub-error components that have been transformed via a transformation function. For example, in some embodiments, quantization functions may include a uniform quantization, a non-uniform quantization, a dead-zone quantization, etc.

In some embodiments, a decoder may be configured to receive a bit stream for a compressed media object that has been compressed via an encoder that performs a similar compression process as described above. The bit stream may include multiple modified sub-error signal components for a given block of the media object, such as a modified edges sub-error signal component that has been processed via a transformation function and quantization parameters at an encoder and such as a modified non-edges sub-error component that has been processed via a different transformation function and/or different quantization parameters at the encoder. Additionally, the bit stream may include data indicating or implying which of a plurality of supported transformation functions and/or which of a plurality of supported quantization functions/quantization parameters were selected at the encoder to process the respective modified edges sub-error signal component and the respective modified non-edges sub-error signal component. The decoder may be configured to separately apply inverse transformation functions and/or inverse quantization functions/quantization parameters to the corresponding modified edges sub-error component and the corresponding modified non-edges sub-error component to yield an unmodified edges sub-error component and an un-modified non-edges sub-error component. The decoder may utilize information in the bit stream to properly select an inverse transformation function and/or inverse quantization function to be applied to each of the modified sub-error components to yield the un-modified sub-error components, such that the selected inverse transformation function and the selected inverse quantization function/quantization parameters correspond to a transformation function and a quantization function/quantization parameters that were applied to the given modified sub-error component during compression.

The decoder may further be configured to sum unmodified sub-error signal components for the given block after applying the inverse transformation function and the inverse quantization function/quantization parameters. The summed unmodified sub-errors may recreate a residual signal to be applied to predicted values, predicted at the decoder. The recreated residual signal may have a better quality and/or may result in greater compression efficiency than would have been the case if a common transformation function and/or a common quantization function/quantization parameters had been applied to the residual signal for the given block without decomposition.

In some embodiments, decomposition functions, transform functions and/or quantization functions/parameters may be signaled in various ways. For example, in some embodiments, one or more decomposition functions, transform functions for different sub-errors, and/or quantization functions/parameters for different sub-errors may be signaled in a header for a group of frames, signaled for a particular image, or signaled for a particular block of an image. Other example signaling granularities for decomposition functions, transform functions for different sub-errors, and/or quantization functions/parameters for different sub-errors may include signaling for a sequence parameter set, a picture parameter set, a slice/tile parameter set, etc. In some embodiments, general transform functions for different sub-errors of a set of blocks, and/or quantization functions/parameters for different sub-errors of a set of blocks may be signaled at a higher level with more specific transform functions for different sub-errors, and/or quantization functions/parameters for different sub-errors signaled specifically for particular images, blocks, etc. at a lower level, wherein the lower level parameters supersede the higher level parameters for the particular images, blocks, etc.

In some embodiments, transform functions for different sub-errors, and/or quantization functions/parameters for different sub-errors may be signaled in a transformation/quantization matrix that defines relationships to be used to determine transform functions for different sub-errors, and/or quantization parameters for different sub-errors. The quantization matrix may be known by both the encoder and decoder, so that, instead of having to signal a transform function and quantization functions/parameters/processes for each sub-error of each block, the encoder may signal an identifier of a quantization matrix to be used for a set of images, an image, or a block of an image, wherein the decoder utilizes the relationships in the known quantization matrix to determine the respective inverse transform function, inverse quantization functions/parameters/processes, etc. to use for each block being decoded.

Also, in some embodiments weighting factors may be signaled for respective transform functions for different sub-errors, and/or quantization functions/parameters/processes for different sub-errors.

In some embodiments, wherein a block is decomposed into sub-errors for regions of the block, overlap of regions may be permitted. In some embodiments, a decoder may be configured to process the overlapping portions by finding an average of the overlapping sub-errors, interpolating between the sub-errors, applying a weighting factor to the sub-errors, or other suitable manner to determine an appropriate residual signal to be applied to overlapping sub-error portions.

In some embodiments, non-normative filters may be used to decompose the residual signal into a plurality of sub-error signal components. Because the decoder will sum the signaled sub-error components, whatever they are, the decoder does not necessarily need to know what filters were used to decompose the residual signal. This may provide a user of such an encoder greater flexibility to design filters to be used to decompose a residual signal into sub-error signal components that are of importance to the user's particular implementation of the encoder. In some embodiments, metadata embedded in an image or input provided by a user may be used to determine how to decompose a residual signal.

In some embodiments, differences in quantization parameters for different sub-error signal components could be determined at the encoder using a rate distortion optimization approach where the quantization values for the different sub error signal components are used to determine one or more Lagrangian multiplier parameters. If using one Lagrangian multiplier, its value can be computed by considering both quantization values, e.g. by averaging them or using some other formulation to compute a combined quantization value. Alternatively, one could compute multiple Lagrangian multiplier parameters with each one associated with each separate sub-error and its corresponding quantization parameter (QP). In such a case, Lagrangian optimization could be performed by optimizing/minimizing the criterion J computed as follows:

$$J = D + \sum_{i=0}^{N-1} \lambda_i(Q_i) \times \text{bits}_i$$

In the above equation, J is an objective function that is being minimized, D is an offset or a baseline value of the objective function J, the lambda ($\lambda$) function is a function that is commonly quantizer but also content dependent and is referred to as the Lagrangian multiplier, the Q variable is the currently used quantization parameter, and the bits variable corresponds to the number of bits required to encode the selected region on which the optimization is performed using the quantization parameter Q.

In some embodiments, the process of generating the sub-error signal components could be open loop, e.g. each sub-error could be generated independently from the original residual value without considering coding impact on any of the lower indexed sub-errors. However, in some cases improved performance could be achieved by using a closed loop method where the sub-error signal components could be generated by also considering distortion introduced by coding such lower indexed sub-error signal components. For example, assuming a residual (e.g. "Error") is decomposed into two sub-errors, (e.g. "subError$_0$" and "subError$_1$") the subError$_1$ could be generated as follows:

$$\text{subError}_1 = \text{Error} - T_0^{-1}(Q_0^{-1}(Q_0(T_0(\text{subError}_0))))$$

It should be noted that the generation of the sub-error signal components in this manner has no implications to the decoder design, which remains the same. Only the residual values of subError$_1$ are impacted since now those also contain the impact of the quantization on subError$_0$.

Example Compression Loop/Encoder

For example, FIG. 1 illustrates compression loop 100 that receives input video data 102. Some portion of the input video data 102 is used to determine predicted pixel values via intra-prediction module and/or motion estimation/compensation module 128. The predicted values 136 are compared to original pixel values in the input video data 102 to determine residual values 104 (e.g. differences between the predicted pixel values and the pixel values of the input video data 102). The residual values 104 are further processed via a transformation module 106 and quantization module 108 and are output as compressed image/video data 110. The transformed/quantized residual values (e.g. compressed image/video data 110) are entropy encoded via entropy encoding module 112 and output as an encoded compressed bit stream 114.

Compression loop 100 also includes an inverse quantization module 116 and an inverse transformation module 118. The inverse quantization module 116 and the inverse transformation module 118 reconstruct the residual values, such that they are similar to the residual values 104 prior to passing through transformation module 106 and quantization module 108. For example, the inverse quantization/inverse transform modules undo the transformations and quantizations that were applied at transformation module 106 and quantization module 108. Except the output of the inverse transformation module 118 may include any distortion introduced as a result of the transformation and quantization of the residual values. The output of the inverse transformation module 118 is combined with predicted pixel values 140 from motion compensation/intra prediction module 128 to generate a reconstructed version of the original pixel values (e.g. decompressed pixel values 138). The decompressed pixel values 138 are further processed by in loop filters, such as deblocking filter 120 and sample adaptive offset (SAO) filter 122. Reconstructed image frames comprising the decompressed pixel values 138 that have been filtered by deblocking filter 120 and SAO filter 122 are stored in decoded picture buffer 124.

The images in the decoded picture buffer 124 may be used as an input to estimate distortion of intra-mode compression. For example, intra-mode estimation module 132 may utilize a previously encoded region from the current image that is also stored in the decoded picture buffer 124, to estimate distortion as compared to an uncompressed region in the current image frame.

As used herein, intra-mode compression refers to compression using predicted values and residual values determined within an image frame based on values of other pixels in the same image frame. For example, an intra-mode compression technique may take a subset of pixel values of an image and explicitly include the subset. In some embodiments, the sub-set may be a single starting pixel value or set of pixel values. Additionally, the intra-prediction technique uses these starting pixel values to predict pixel values of neighboring pixels. Such a process may be iterative and may proceed block by block wherein pixel values are predicted for a block at a time. These predicted pixel values may then be compared to actual pixel values of the image to determine residual values. The residual values may then be encoded for use by a decoder to correct predicted pixel values generated using the same or a similar prediction process.

In contrast, as used herein, inter-prediction refers to compression techniques that utilize differences between image frames, such as due to temporal changes, to predict pixel values. For example, motion estimation and motion vectors may be used in an inter-prediction method to estimate and indicate motion of blocks or other sub-units of an image between image frames (e.g. temporal differences). These motion vectors may then be used to predict pixel values for subsequent image frames relative to a reference image frame, wherein the predicted pixel values compensate for the motion between image frames.

The images in the decoded picture buffer 124 may be used by motion compensation estimation module 134 to determine estimated motion and/or distortion between an uncompressed image frame and a reconstructed image frame, wherein the reconstructed image frame is compressed and decompressed using inter-compression techniques such as motion estimation and compensation.

The estimated distortion and/or compression efficiency determined by intra-mode estimation module 132 and motion compensation estimation module 134 may be provided to mode decision module 130, wherein mode decision module 130 selects whether to compress a given image region, such as a block, or even an entire frame using an intra-prediction technique or an inter-prediction technique.

In some embodiments, a device, such as a mobile device with a screen and camera that is capturing an image or video that is being compressed, may also display the video image. For example, reconstructed image frames stored in decoded picture buffer 124 may further be provided to display 126 for rendering on a display. In some embodiments, the display may be omitted.

Traditionally, image and video coding schemes perform prediction as described above (either intra-prediction or inter-prediction) on a region of an image to be compressed and encoded. For example, such as a block area of size M×N. Previously encoded samples, such as other blocks in the same image may be used in an intra-prediction technique, whereas corresponding blocks in other image frames at different times may be used in an inter-prediction technique.

In some embodiments, the in-loop filters, such as deblocking filter 120, SAO filter 122, and/or additional in-loop filters may be applied on a portion of an image (e.g. a block) as well as neighboring portions of the image (e.g. neighboring blocks). The in-loop filters may reduce possible coding/compression artifacts that the coding/compression process may have introduced.

The encoded compressed bit stream 114 may include any information needed to reconstruct the portions (e.g. blocks) of an image being compressed and encoded, such as partitioning information, an indication of the prediction mode selected, and its associated information, e.g. motion vectors and reference indices, the type of the transform function or transform functions used, quantization parameters/quantization functions used, as well as any remaining quantized coefficients, among others.

An inverse process, to some extent, is followed at a decoder, with first entropy decoding being performed on the compressed bit stream to derive the encoded information (partitions, modes, motion vectors/mvs, quantized coefficients, etc.), followed by the prediction process. The inverse quantization and transform steps could be performed in parallel, and the reconstructed residual is then added onto the prediction information. This reconstructed block may then be in-loop filtered given the appropriate in-loop filtering mechanisms supported and used by the underlying codec.

Example Decompression Loop/Decoder

Figure 2:
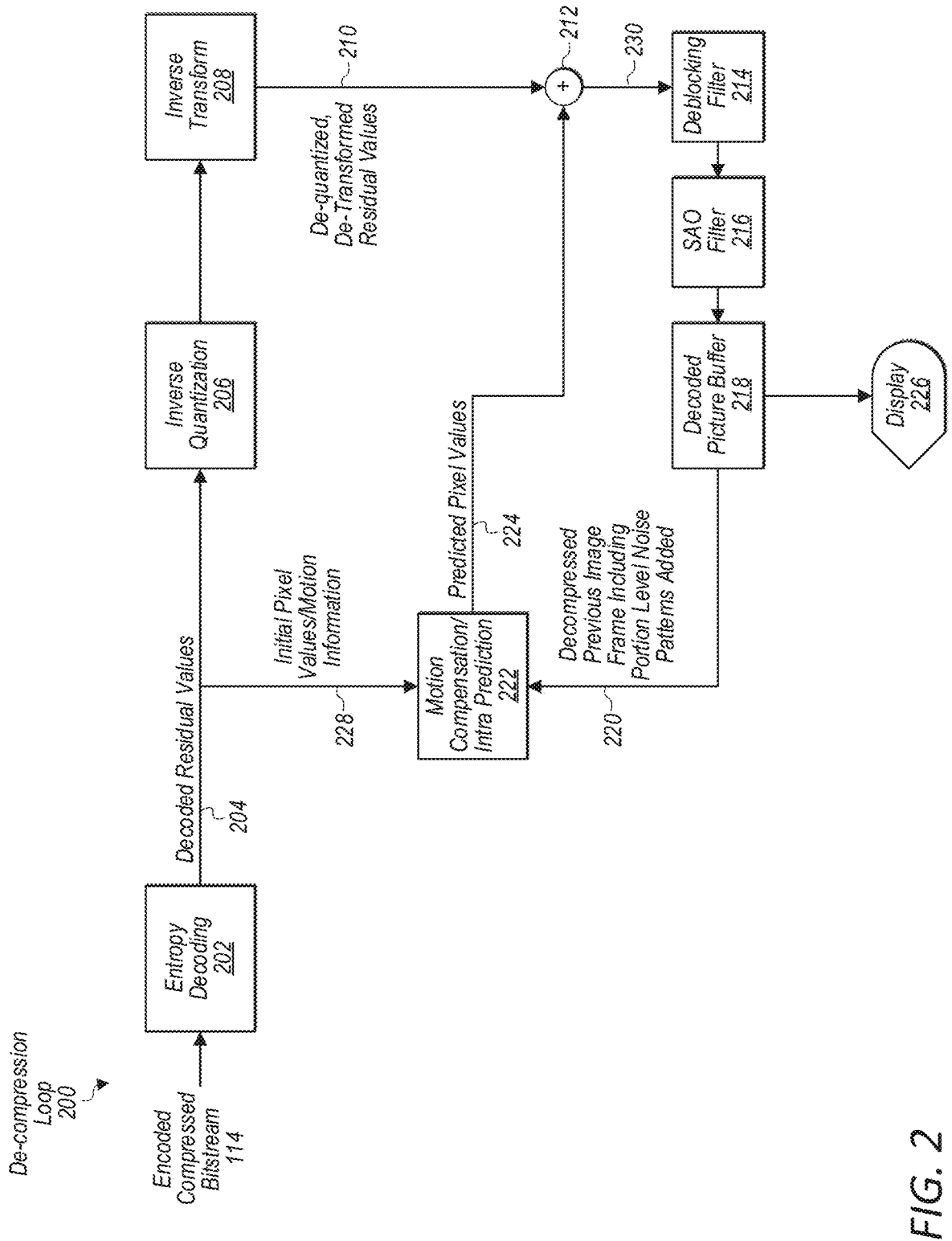
FIG. 2 illustrates an example video decompression loop of a decoder, according to some embodiments.

For example FIG. 2 illustrates an example video decompression loop of a decoder, according to some embodiments.

Entropy decoding module 202 of decompression loop 200 receives encoded bit stream 114 and entropy decodes the encoded bit stream. Decoded residual values 204 (which may be similar to residual values determined at an encoder that have been transformed and quantized, such as via transformation module 106 and quantization module 108) are processed by inverse quantization module 206 and inverse transform 208 to generate de-quantized, de-transformed residual values 210. Additionally, information 228 (e.g. initial pixel values, motion vectors, etc.) is provided to motion compensation intra/prediction module 222. Information 228 may include an indication as to whether the image was compressed via intra-prediction or inter-prediction.

If compressed via intra-prediction, information 228 may include at least one or more initial pixel values for at least one pixel of a compressed image. The at least one or more pixel values may be starting values that are used to predict pixel values for other pixels via the intra-prediction process. Alternatively, if the image was compressed via inter-prediction, the information 228 may include motion vectors (mvs). Motion compensation/intra prediction module 222 may generate predicted pixel values 224, and the predicted pixel values 224 may be combined with de-quantized, de-transformed residual values 210 to yield decompressed pixel values 230. The decompressed pixel values 230 may further be filtered by one or more in-loop filters, such as deblocking filter 214 and sample adaptive offset (SAO) filter 216. The filtered decompressed pixel values are reconstructed into decompressed image frames and are stored in decoded picture buffer 218. In some embodiments, decompressed image frames from decoded picture buffer 218 may be used by motion compensation/intra-prediction module 222 to estimate motion between blocks (or other portions) of sequential image frames.

Figure 3:
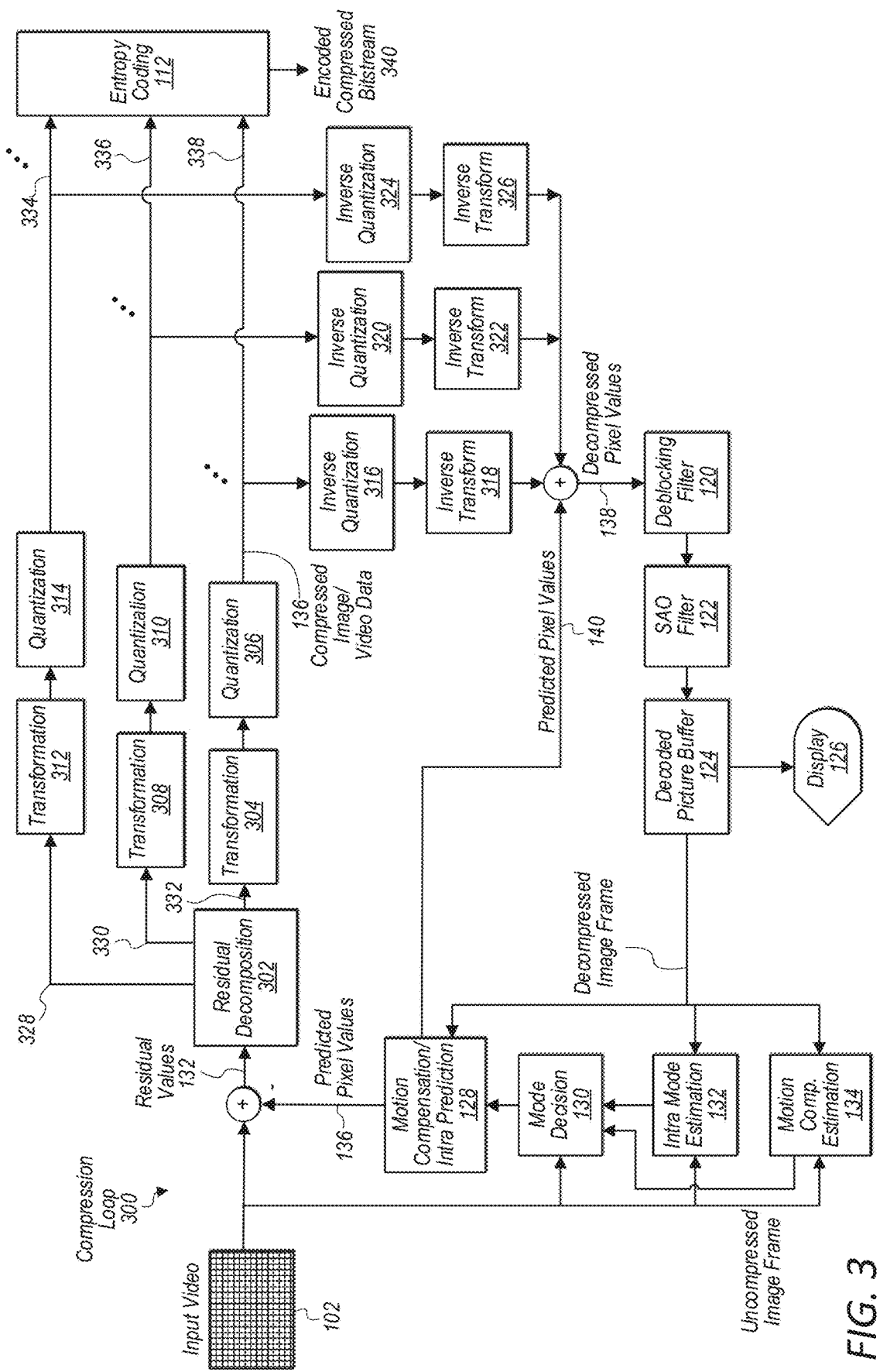
FIG. 3 illustrates an example video compression loop that includes residual decomposition and separately processed sub-errors, according to some embodiments.

Example Compression Loop/Encoder with Separately Controllable Processing of Sub-Errors FIG. 3 illustrates an example video compression loop that includes residual decomposition and separately processed sub-errors, according to some embodiments.

Compression loop 300 includes similar in-loop filters as compression loop 100, such as de-blocking filter 120 and SAO filter 122. Compression loop 300 also includes similar components for predicting pixel values, such as intra-prediction/motion compensation module 128, mode decision module 130, intra-mode estimation module 132 and motion compensation estimation module 134. However, in contrast to compression loop 100, compression loop 300 additionally includes residual decomposition module 302 and multiple sets of transformation modules and quantization modules. Also, compression loop 300 includes multiple sets of inverse quantization modules and inverse transformation modules.

For example, residual decomposition module 302 may decompose residual values 132 into multiple sub-error signals, such as sub-error signal 328, sub-error signal 330, and sub-error signal 332. As an example, in some embodiments, residual decomposition module 302 may decompose residual signal 132 into sub-error signals for different respective aspects of a block, such as different textures, different colors, edges vs. non-edges, etc. In some embodiments, residual decomposition module 302 may determine whether or not a residual signal for a portion of a media object is to be decomposed and, if so how the residual signal is to be decomposed and into how many sub-error signals the residual signal is to be decomposed.

Each of the sub-error signals 328, 330, and 332 may be processed by separate transformation modules and separate quantization modules, which may be configured to perform different transform operations and to apply different quantization parameters/functions to the respective sub-error signals. For example, respective ones of transformation modules 304, 308, and 312 may be configured to apply different transform operations than other ones of transform modules 304, 308, and 312. In a similar manner, respective ones of quantization modules 306, 310, and 314 may be configured to apply different quantization parameters than other ones of the quantization modules 306, 310, and 314.

The respective sub-error components that have been processed via the respective different transformation modules and quantization modules, such as modified sub-error signals 334, 336, and 338 may be entropy encoded at entropy encoding module 112 and included in an encoded compressed bit stream 340.

Additionally, the modified sub-error signals 334, 336, and 338 may be provided to respective inverse quantization modules and inverse transform modules that inverse the quantization and transform operations applied previously in the compression loop 300. For example, modified sub-error signal 334 may be provided to inverse quantization module 324, which may apply an inverse quantization function that reverses the quantization applied at quantization module 314. After applying the inverse quantization, the modified sub-error signal 334 is provided to inverse transformation module 326 which applies an inverse transform operation that reverses the transformation of the sub-error signal applied at transform module 312. In a similar manner, inverse quantization module 320 and inverse transform module 322 may reverse a quantization process applied at quantization module 310 and reverse a transform operation applied at transform module 308. Additionally, inverse quantization module 316 and inverse transform module 318 may reverse a quantization process applied at quantization module 306 and may reverse a transform operation applied at transform module 304. Thus, the output sub-error signals of inverse transform modules 318, 322, and 326 may resemble the sub-error signals 328, 330, and 332 prior to processing. However, the output sub-error signals of inverse transform modules 318, 322 may account for any distortion or artifacts introduced during the compression process. These inverse modified sub-error signals may be added to the predicted pixel values 140 to result in decompressed pixel values 128, which may further be processed via in loop filters, such as de-blocking filter 120 and SAO filter 122. The filtered recreated decompressed pixel values may then be used in the prediction process to generate predicted pixel values 140. Additionally, in some embodiments these values may be used to adjust transform operations and/or quantization parameters selected to be applied to respective ones of the sub-error signals. Also, these values may be used in a rate distortion optimization operation or a Lagrangian optimization to select quantization parameters, as discussed above and in more detail below.

Figure 4:
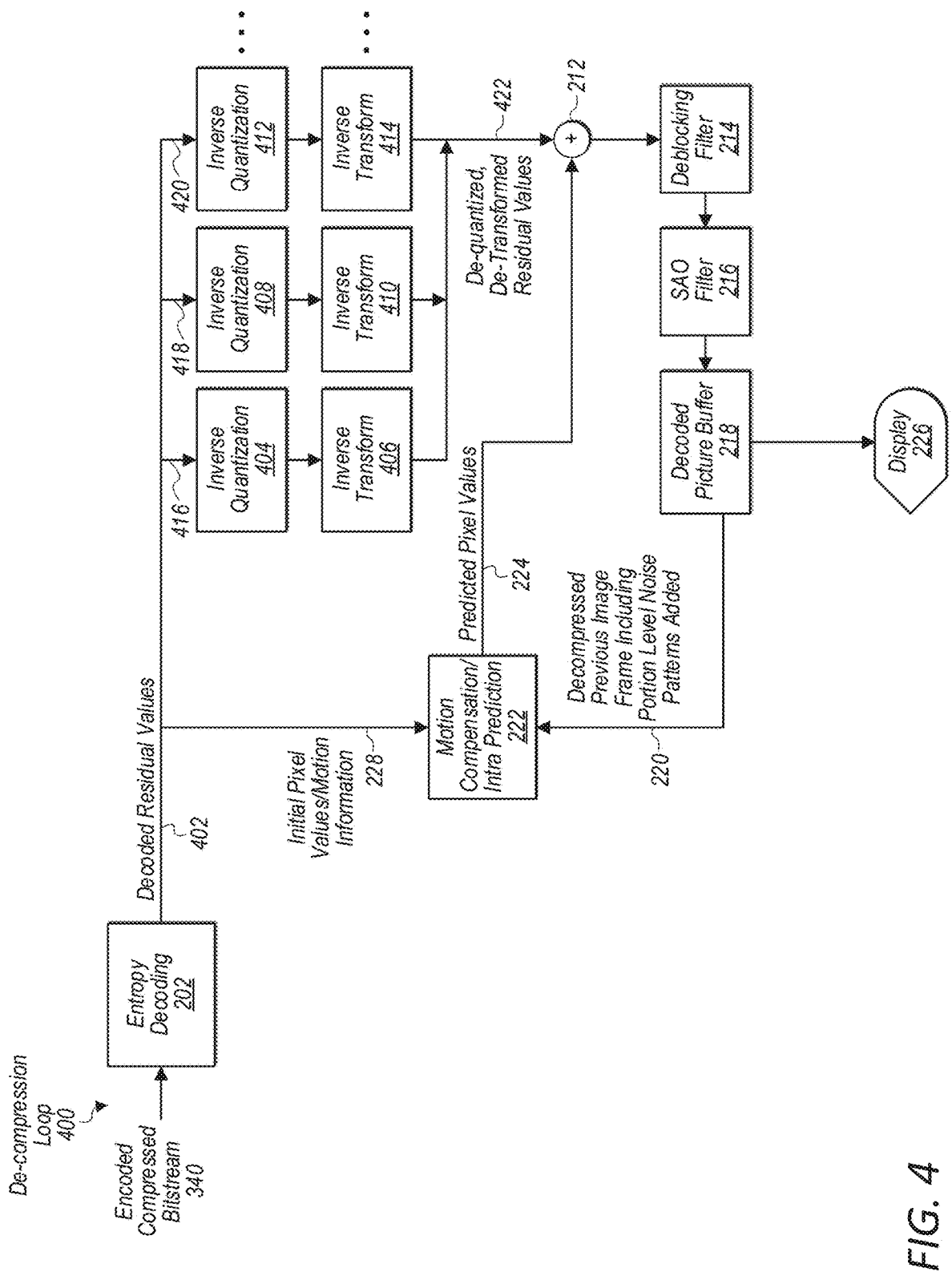
FIG. 4 illustrates a decoder configured to receive a compressed video file comprising separately processed sub-errors for blocks of the video, wherein the decoder separately applies inverse processing to the sub-errors to reconstruct the compressed video, according to some embodiments.
Figure 6A:
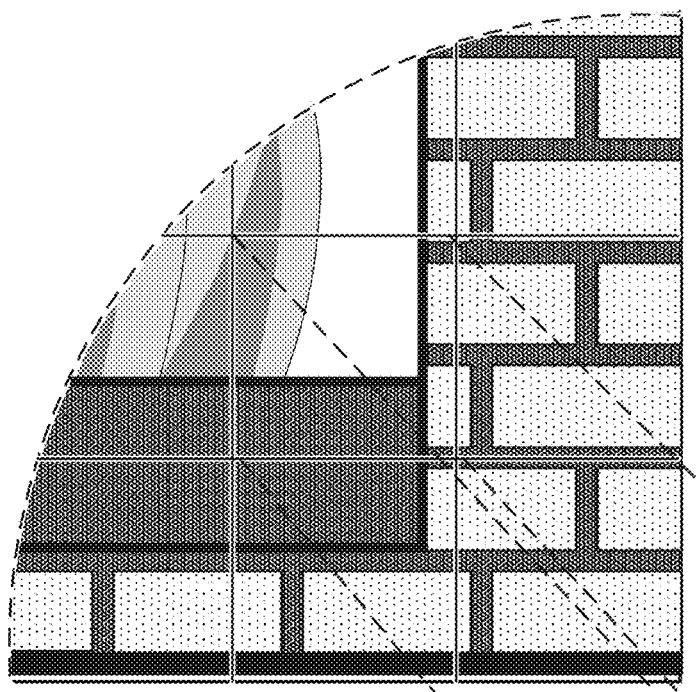
FIGS. 6A-D illustrate an example decomposition of residuals for a block into a plurality of sub-errors via an edge extraction technique, according to some embodiments.
Figure 6B:
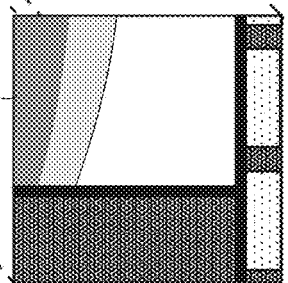
Figure 6C:
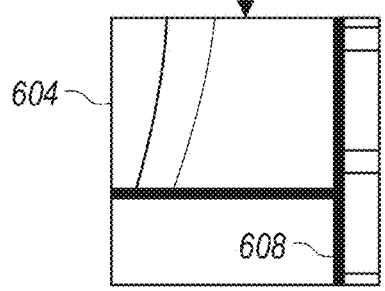
Figure 6D:
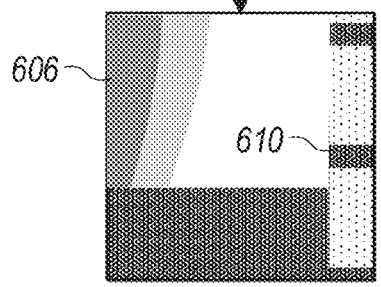
Figure 7A:
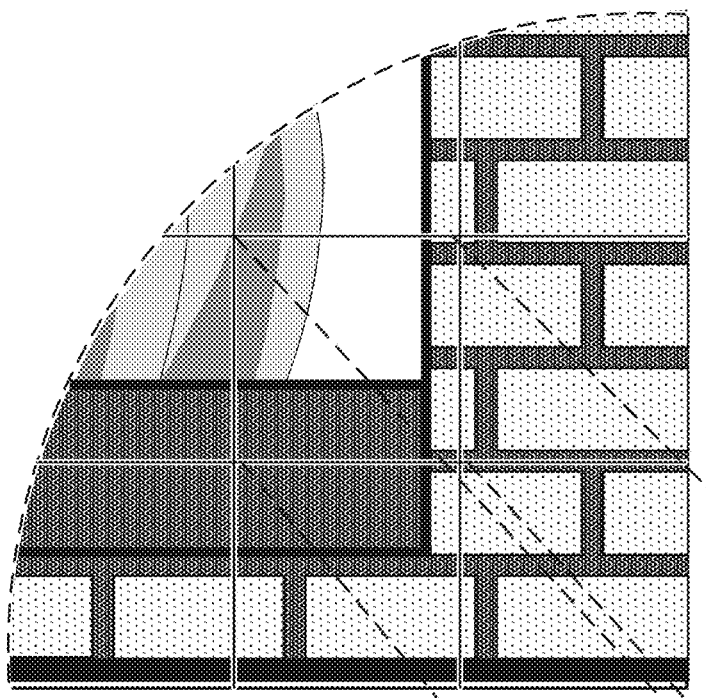
FIGS. 7A-E illustrate another example decomposition of residuals for a block into a plurality of sub-errors via a combination of an edge extraction technique, a texture extraction technique, and a color extraction technique, according to some embodiments.
Figure 7B:
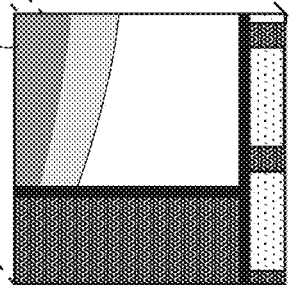
Figure 7C:
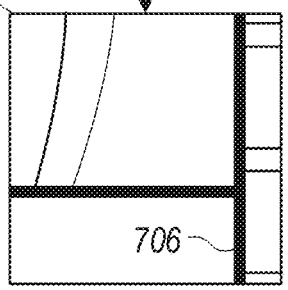
Figure 7D:
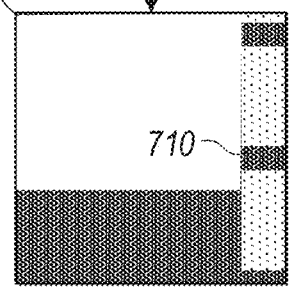
Figure 7E:
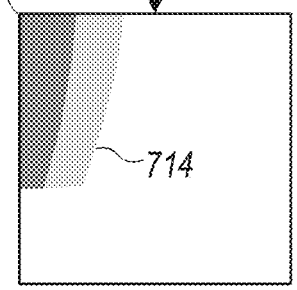

FIG. 4 illustrates a decoder configured to receive a compressed video file comprising separately processed sub-errors for blocks of the video, wherein the decoder separately applies inverse processing to the sub-errors to reconstruct the compressed video, according to some embodiments.

Decompression loop 400 includes similar in loop filters as decompression loop 200, such as deblocking filter 214 and SAO filter 214. Decompression loop 400 also includes an intra-prediction and motion compensation module 222 that predicts predicted pixel values 224. However, in contrast to decompression loop 200, decompression loop 400 includes multiple sets of inverse quantization modules and inverse transform modules for respective ones of a plurality of modified sub-error signals.

For example, decompression loop 400 may receive an encoded compression bit stream 340, which may be a bit stream generated by a compression loop with separately controllable processing of sub-error signals, such as compression loop 300. The decompression loop 400 includes an entropy decoding module 202 which decodes the entropy encoding performed at an encoder to yield multiple separate sub-errors signals that have been modified using different transform operations and/or quantization parameters at an encoder. In some embodiments, encoded compressed bit stream 340 may further include data indicating which transform operations and/or which quantization parameters were applied to which sub-error signals at the encoder. In some embodiments, some or all of these parameters may be known to both the encoder and decoder (e.g. both the encoder and decoder may follow a standard defining which transform operations and quantization parameters to apply to different sub-error components). In some embodiments, some or all of the parameters may be inferred based on other data included in the bit stream, or may be explicitly signaled. In some embodiments, one or more indexes known to both the encoder and decoder may be used to signal transform operations and quantization parameters to be used in decoding an encoded compressed bit stream. In some embodiments, a quantization matrix defining relationships for determining which transform operations and/or quantization parameters to use for different sub-error component streams may be used.

For example, modified sub-error signal 416 may be provided to inverse quantization module 404 that applies an inverse quantization that reverses a quantization process applied to modified sub-error signal 416 at an encoder. Also, the output of inverse quantization module 404 is provided to inverse transform module 406 that applies an inverse transform operation that reverses a transform operation applied to the modified sub-error signal 416 at an encoder. In a similar manner inverse quantization module 408 and inverse transform module 410 apply inverse quantization and inverse transform operations to modified sub-error signal 418 to reverse quantization and transformation applied to the sub-error signal 418 at an encoder. Likewise, inverse quantization module 412 and inverse transform module 414 apply inverse quantization and inverse transform operations to modified sub-error signal 420 to reverse quantization and transformation applied to the sub-error signal 420 at an encoder.

In some embodiments, respective ones of inverse quantization modules 404, 408, and 412 may each apply different inverse quantization parameters that correspond to quantization parameters applied to the respective modified sub-error signals 416, 418, and 420 at an encoder. Also, respective ones of inverse transform modules 406, 410, and 414 may each apply different inverse transform operations that correspond to transform operations applied to the respective modified sub-error signals 416, 418, and 420 at an encoder.

FIG. 5A illustrates a set of image frames of a video, according to some embodiments.

For example, image frame 1 (504), image frame 2 (506), and image frame N (508), may each be image frames of a video that is to be compressed via a compression loop, such as compression loop 300 discussed in regard to FIG. 3.

FIG. 5B illustrates one of the image frames that has been partitioned into a plurality of blocks, according to some embodiments.

Respective ones of the images may be partitioned into M×N or N×N blocks, such as 16×16 pixel blocks, as an example. FIG. 5B illustrates a zoomed in portion of image frame N (508) showing blocks 510, 512, etc. (Note that the blocks may actually be much smaller than illustrated in FIG. 5B. However, for ease of illustration with regard to decomposition larger blocks are illustrated).

FIGS. 6A-D illustrate an example decomposition of residuals for a block into a plurality of sub-errors via an edge extraction technique, according to some embodiments.

For example block 602 may be processed via a decomposition module, such as residual decomposition module 302, to separate out an edges sub-error signal from a non-edges sub-error signal. For example, image 604 illustrates extracted edges 608, whereas image 606 illustrates non-edges portions 610 of the image 602.

For example, an edge filter, such as a Sobel filter, Prewitt, Canny, or Laplacian filter, may be applied to the image of block 602 to yield the extracted edges image 608. Then, the extracted edges may be applied as a mask to the image of block 602 to yield the non-edges image 610.

FIGS. 7A-E illustrate another example decomposition of residuals for a block into a plurality of sub-errors via a combination of an edge extraction technique, a texture extraction technique, and a color extraction technique, according to some embodiments.

In some embodiments, other decomposition processes may be used. For example, the image of block 702 may be decomposed into a first sub-error signal 704 comprising edges 706, a second sub-error signal 708 comprising certain textures 710, a third sub-error signal 712 comprising certain colors 714, etc. Also, while not shown in some embodiments, an additional fourth error signal may include any remaining aspects of the image of block 702 not included in other ones of the sub-error signals. As discussed herein, different quantization parameters and transform operations may be selected at an encoder and inversed at a decoder, wherein the quantization parameters and transform operations are selected to improve the quality of the reconstructed image and/or improve compression performance.

FIGS. 8A-E illustrate an example decomposition of residuals by region for a block into a plurality of sub-errors, according to some embodiments.

As another example, in some embodiments, a residual signal for a block may be decomposed based on regions within the block. For example, the image of block 802 may be decomposed into a first sub-error signal 804 for region 806, a second sub-error signal 808 for region 810, and a third sub-error signal 812 for region 814. In some embodiments different quantization parameters and transform operations/functions (and corresponding inverse quantization parameters and inverse transform operations) may be selected for each of sub-error signals 804, 808, and 812.

FIGS. 9A-E illustrate an example decomposition of residuals for a block by region, with overlapping regions to result in a plurality of sub-errors that cover overlapping regions, according to some embodiments.

In some embodiments, sub-error signals may overlap and a decoder may average, interpolate, or adjust the sub-errors accordingly for the overlapping portions. For example, the image of block 902 is decomposed into sub-error signal 904 for region 906, sub-error signal 908 for region 910, and sub-error signal 912 for region 914. However, regions 910 and 914 may overlap at overlapping portions 916.

For example, in non-linear decomposition, weighting could also be used. The weighting could depend on pixel position. For example, errors may be decomposed in a triangular manner. That is, assuming a residual block of size M×M, then all samples that have coordinates (i, j) within that block that satisfy the inequality $i+j<M$ are assigned to subError0. All remaining samples are assigned to subError1. In this manner a triangular or other shaped transform may be constructed. In this example, the values that are outside a corresponding partition are discarded during reconstruction.

The above could be generalized to allow overlapping of subErrors within a region. For example, the samples that correspond to subError0 are the ones with coordinates that satisfy the inequality $i+j<M+2$. Equivalently, for subError1 its corresponding samples are the ones that satisfy the inequality $i+j>M-2$. In this case, samples that are at positions $M-2<i+j<M+2$ are present in both regions and would need to be summed together during the reconstruction process.

Figure 10:
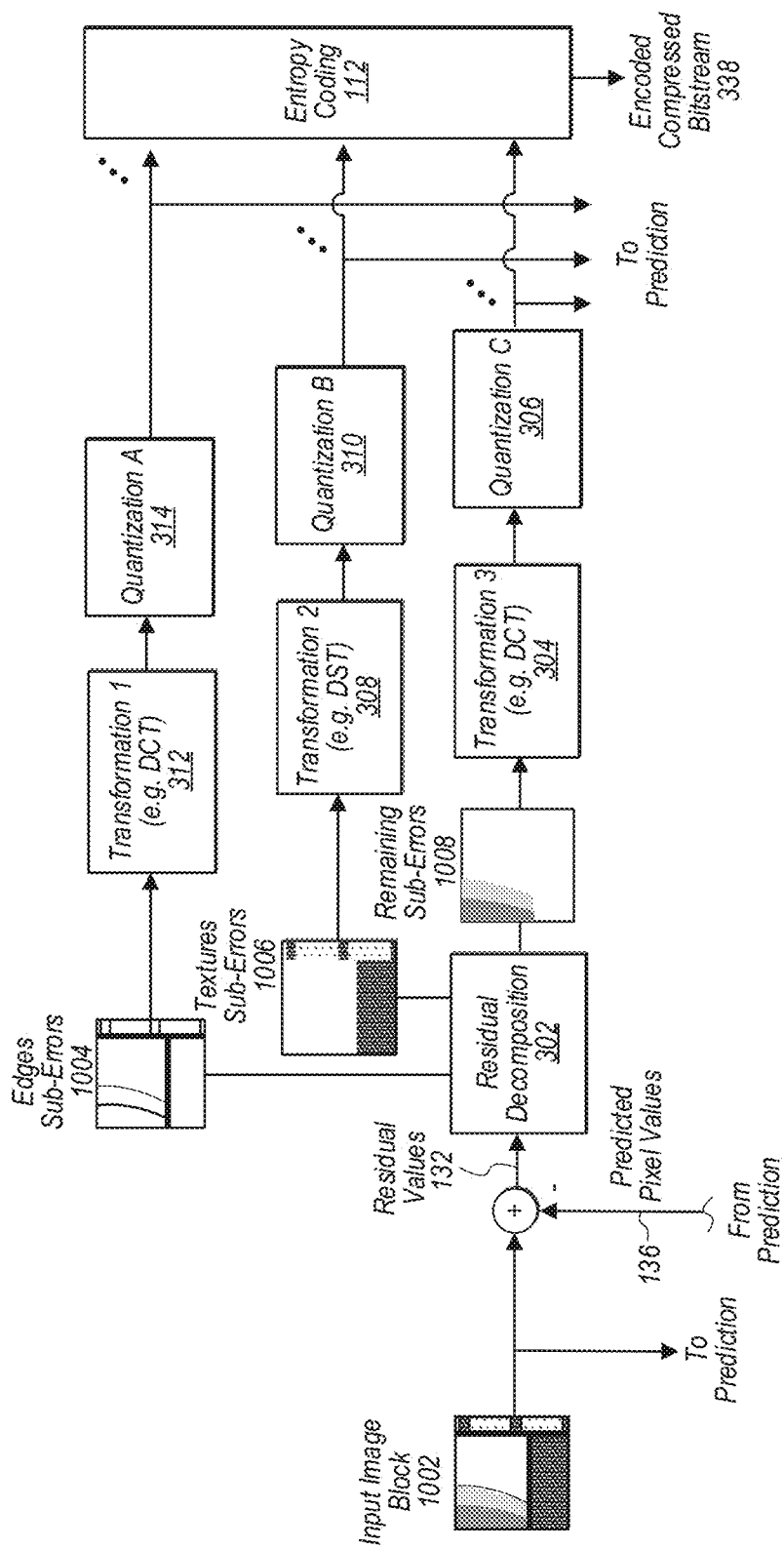
FIG. 10 illustrates an example portion of an encoder that performs residual decomposition and separately processes different sub-errors resulting from the decomposition, according to some embodiments.

FIG. 10 illustrates an example portion of an encoder that performs residual decomposition and separately processes different sub-errors resulting from the decomposition, according to some embodiments.

In some embodiments, input image block 1002 may be processed to determine residual values 132 and the residual values 132 may be decomposed via residual decomposition module 302. For example edges sub-errors 1004, textures sub-errors 1006, and remaining sub-errors 1008 may be generated. A first transformation such as a discrete cosine transform may be applied to the edges sub-errors 1004, while a different transform operation/function, such as a discrete sine transform may be applied to textures sub-errors 1006. Also another transform function such as a discrete cosine transform may be independently selected to be applied to remaining sub-errors 1008. Additionally, different quantization parameters may be applied to each of edges sub-errors 1004, textures sub-errors 1006, and remaining sub-errors 1008, wherein the quantization parameters are independently selected.

FIG. 11 illustrates an example of data that may be signaled to indicate transforms, quantizations, and weighting factors for separate sub-errors of a block, according to some embodiments.

For example, as can be seen in FIG. 11, different transform functions, quantization parameters, and/or weighting factors may be selected for each of the sub error signals 1102, 1104, and 1106. In some embodiments the respective transform functions, quantization parameters, and weighting factors may be individually signaled for each of the sub-error signals 1102, 1104, and 1106, or may be signaled using an index, quantization matrix, or implied based on relationships, as discussed in more detail below.

FIG. 12 illustrates an example of data that may be signaled using one or more indexes known to an encoder and known to a decoder to specify transforms, quantizations, and weighting factors for separate sub-errors of a block, according to some embodiments.

For example, in some embodiments, index values for the respective quantization parameters and transform operations/functions to be applied to sub-error signals may be explicitly or implicitly signaled, wherein the encoder and decoder follow a similar index. For example, in FIG. 12 index values are signaled for the respective parameters to be used for sub-error signals 1202, 1204, and 1206, wherein indexes 1210 and 1220 include corresponding transform functions and quantization functions that correspond to the signaled index values.

FIGS. 13A-D illustrate an example of data that may be signaled using quantization matrices known to an encoder and known to a decoder to specify transforms, quantization, and weighting factors for separate sub-errors of a block, according to some embodiments.

As another alternative, a quantization/transformation matrix may be signaled as opposed to signaling index values for each of the quantization parameters and transform functions, wherein both an encoder and decoder know or can create the same quantization/transformation matrices. In some embodiments general parameters may be signaled at a higher level with specific parameters that deviate from the general parameters signaled at a lower level. For, example a quantization/transformation matrix may be signaled that is to be generally used for multiple blocks in multiple images, but for particular blocks of the images, a different quantization/transformation matrix may be signal led to be used by a decoder.

For example, a first quantization/transformation matrix may be signaled to be used for group of frames 1302, while different quantization/transformation matrices may be signaled to be used for groups of frames 1304 and 1306. Additionally, for specific images or blocks within one of the groups of frames, a particular quantization/transformation matrix may be signaled to be used that deviates from the quantization/transformation matrix signaled to be used for the overall group of frames. For example for image 1308 or block 1310, a different particular quantization/transformation matrix may be signaled to be used. While not shown, in some embodiments, instead of signaling different quantization/transformation matrices, in some embodiments, particular index values of transform functions/quantization parameters may be explicitly signaled for particular sub-error components that deviate from generally applied transform functions and quantization parameters.

FIGS. 13C and D illustrate example quantization/transformation matrices 1312 and 1318 which may be known by an encoder and decoder, and signaled as shown in FIGS. 13A and/or 13B.

In some embodiments, a quantization matrix may define conditions upon which different parameters are to be used. For example, quantization matrix 1318 defines a first transform "X" to be used for sub-error signal 1 if condition "A" is present and a second transform "Y" to be used if condition "B" is present. In some embodiments, which transform function is used is determined by a condition that is used to select the quantization parameters and vice-versa. In some embodiments, weighting factors may be defined in a quantization/transformation matrix using a formula or other relationship. For example in quantization/transformation matrix 1312, the weighting factors are determined using a formula based on a number of sub-error signals included for a given block.

Figure 14A:
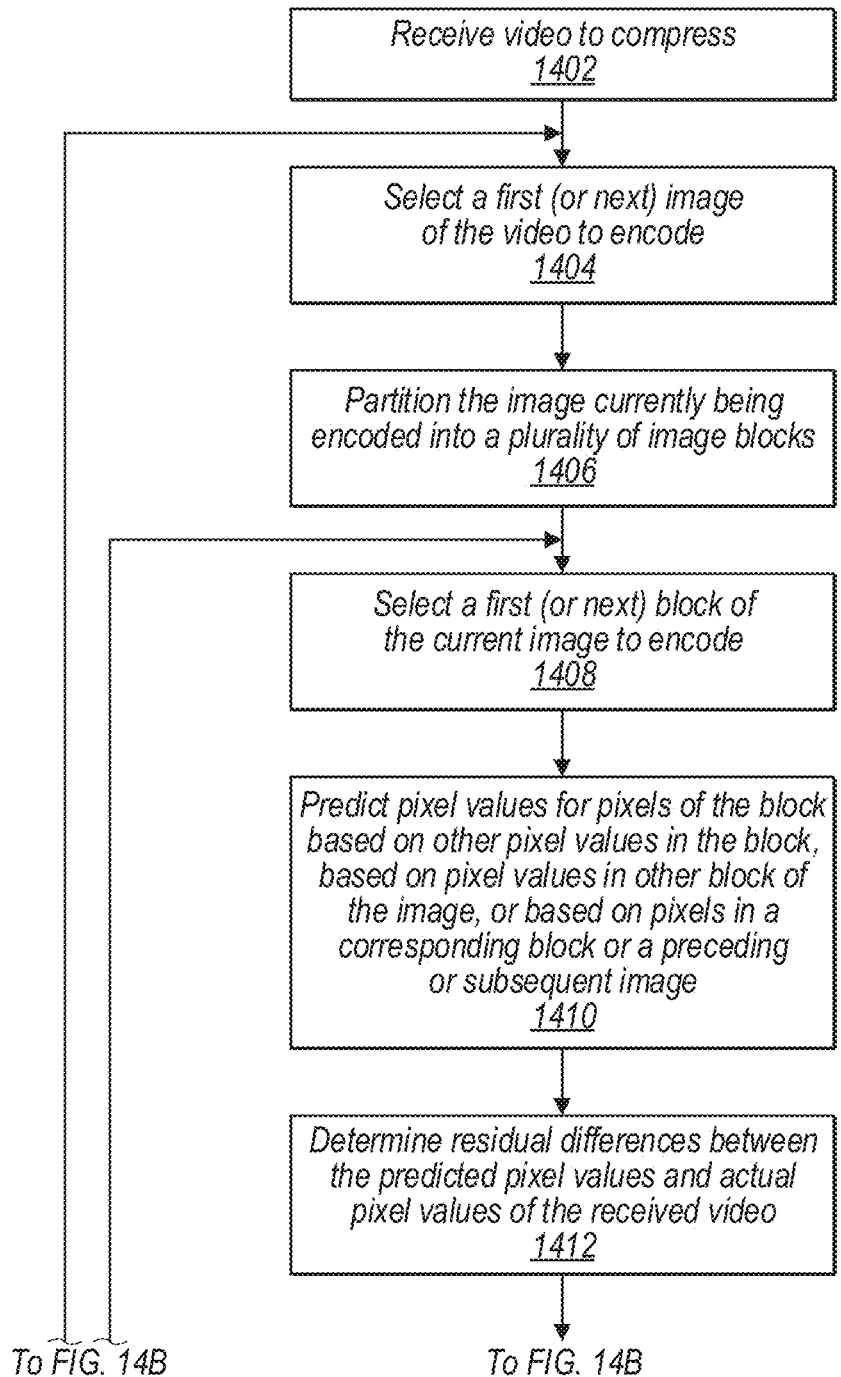
FIGS. 14A-C illustrate an example encoding process for blocks of a media object that includes residual decomposition and separately processed sub-errors, according to some embodiments.
Figure 14B:
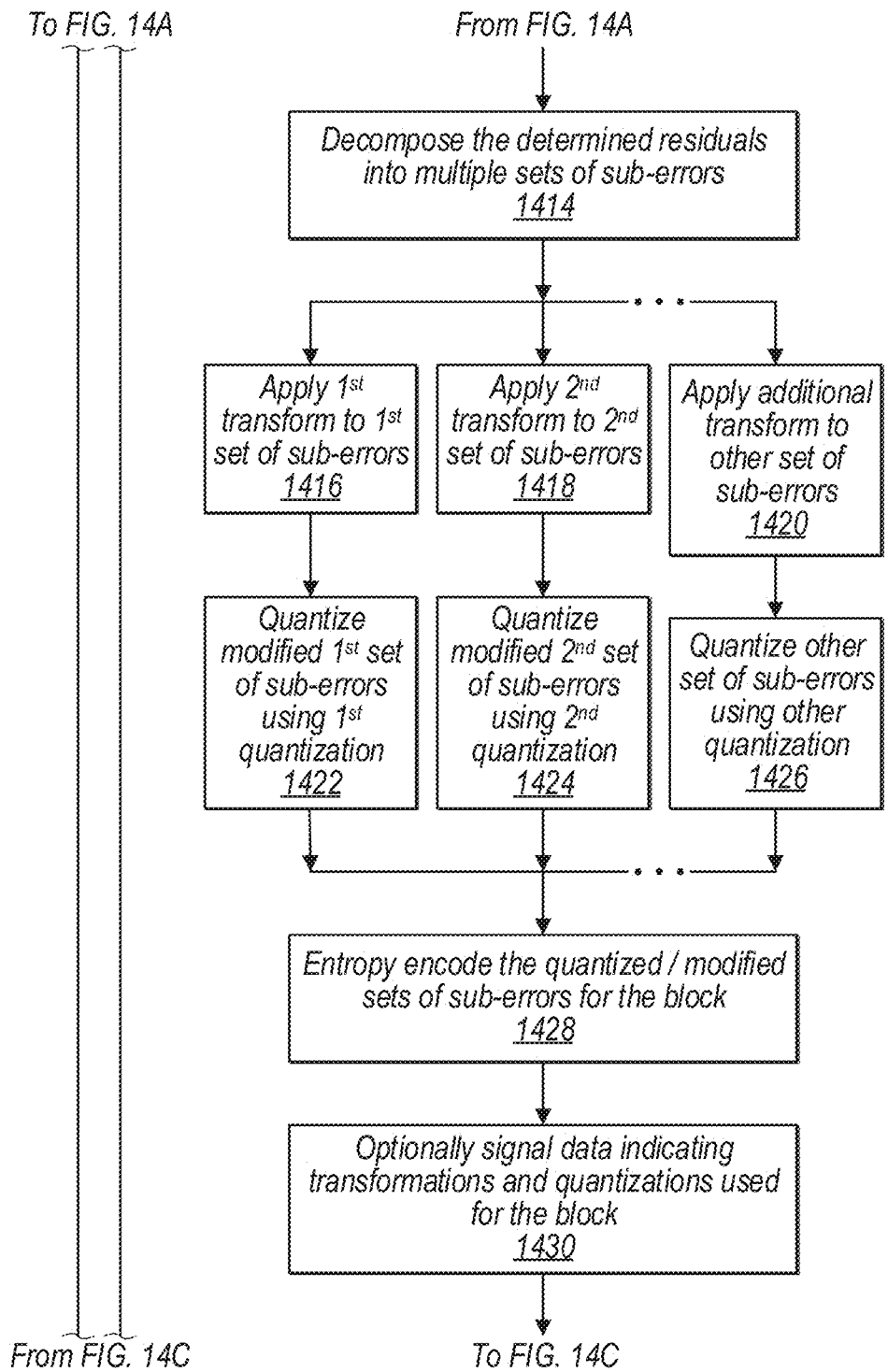
Figure 14C:
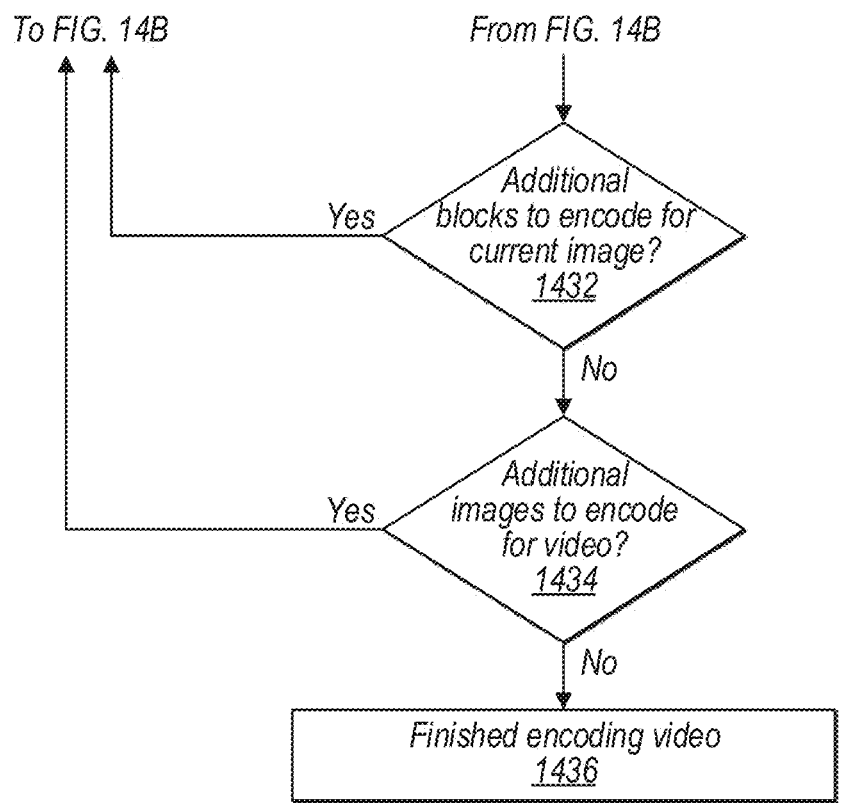

FIGS. 14A-C illustrate an example encoding process for blocks of a media object that includes residual decomposition and separately processed sub-errors, according to some embodiments.

At 1402, an encoder receives a media object to encode such as a video.

At 1404, the encoder selects a first (or next) image of the media object (e.g. video) to encode. At 1406, the encoder partitions the selected image into a plurality of blocks, such as M×M blocks (e.g. 16 pixel×16 pixel blocks).

At 1408, the encoder selects a first (or next) block of the selected image to encode.

At 1410, the encoder predicts pixel values for pixels of the block based on other pixel values in the block, based on pixel values in other block of the image, or based on pixels in a corresponding block or a preceding or subsequent image in the video.

At 1412, the encoder determines residual differences between the predicted pixel values and actual pixel values of the received video.

At 1414, the encoder decomposes the residual signal into a plurality of sub-error signals. In some embodiments, a residual decomposition module, such as residual decomposition module 302, may determine whether or not residuals for a given block are to be decomposed. Also, the residual decomposition module may determine what type of decomposition function is to be used to decompose the residuals for the given block. Additionally, the decomposition module 302 may determine a number of sub-error signals into which the residuals for a given block are to be decomposed. Thus, while not shown in FIG. 14B, in some embodiments, an additional path may be followed for a given block for which it is determined that decomposition is not to be applied to the residuals for the given block.

At 1416 the encoder applies a first transform function to a first set of sub-errors and at 1422 quantizes the modified first set of sub-errors using a first quantization function/quantization parameters.

At 1418, the encoder applies a second transform function to a second set of sub-errors and at 1424 quantizes the modified second set of sub-errors using a second quantization function/quantization parameters.

At 1420, the encoder applies additional transforms to other sets of sub-errors (if any) and at 1426 quantizes the modified other sets of sub-errors using other quantization functions/quantization parameters.

At 1428, the encoder entropy encodes the quantized/modified sets of sub-errors for the block. At 1430, the encoder also optionally signals data indicating transformation functions and/or quantization functions/quantization parameters to be inversed at the decoder.

At 1432, the encoder determines if there are additional blocks to encode for the selected image, if so the encoder returns to 1408 and encodes the next bock. If not, at 1434, the encoder determines whether there are additional images to encode for the media object, if so the encoder returns to 1404 and encodes the next image. If not, at 1436, the encoder finishes encoding the video.

Figure 15:
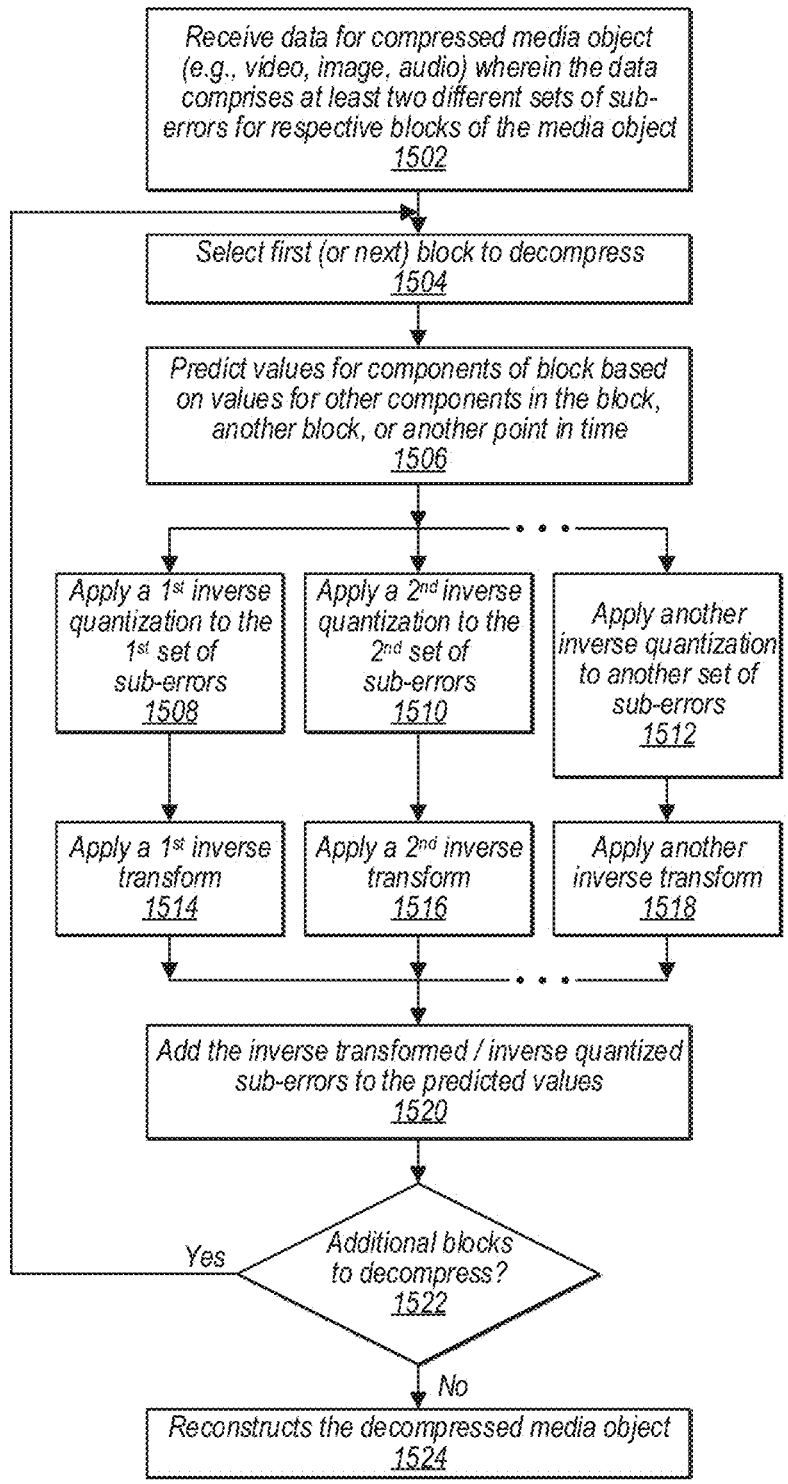
FIG. 15 illustrates an example decoding process for a compressed bit stream that includes separately processed sub-errors for blocks of the bit stream, according to some embodiments.

FIG. 15 illustrates an example decoding process for a compressed bit stream that includes separately processed sub-errors for blocks of the bit stream, according to some embodiments.

At 1502, a decoder receives data for a compressed media object (e.g., video, image, audio) wherein the data comprises at least two different sets of sub-error signal s for respective blocks of the media object.

At 1504, the decoder selects a first (or next) block to decompress. At 1506, the decoder predicts values for components of the block based on values for other components in the block, another block, or components of a corresponding block at another point in time.

At 1508, the decoder applies a first inverse quantization to a first set of sub-errors and at 1514 applies a first inverse transform function to the first set of sub-errors.

At 1510, the decoder applies a second inverse quantization to a second set of sub-errors and at 1516 applies a second inverse transform function the second set of sub-errors.

At 1512, the decoder applies other inverse quantizations to other sets of sub-errors (if any) and at 1518 applies other inverse transform functions to the other sets of sub-errors.

At 1520, the decoder adds the inverse transformed/inverse quantized sub-errors to the predicted values determined at 1506.

At 1522, the decoder determines if there are additional blocks to decompress for the media object (e.g. image frame). If so the decoder returns to 1504 and processes the next block. If not, at 1524, the decoder reconstructs the decompressed media object (e.g. image frame). In some embodiments, wherein the media object is a video comprising multiple image frames, the process illustrated in FIG. 15 may be repeated for subsequent image frames.

Additional Detailed Discussion

In some embodiments, residual signals are decomposed into multiple residuals (e.g. sub-errors), each of which can be coded independently, e.g. using different transforms and quantization. These coded sub-errors are then inverse quantized, transformed, and then added together to generate the final reconstructed residual. The decomposition of the residuals needs not be limited based on the separation of what is deemed as the signal and noise. Instead, any kind of decomposition could be used, e.g. based on texture, edges, color, noise, etc. or other features that may be deemed as being of different importance by an encoder. In this way, an encoder can essentially place different importance on different characteristics of the image and the residual, and code such characteristics with different/higher quality than others.

In some embodiments, a residual signal Error is decomposed to multiple sub-error components $subError_i$, e.g. N, as follows:

$$Error = \sum_{i=0}^{N-1} subError_i$$

Then, each of these sub-errors are transformed and quantized. Transform could be the same for all sub-errors or could be a different transform. The relationships between transforms could be signaled for every block or could be signaled at a higher layer, e.g. in the sequence parameter sets, the picture parameter sets, or slice/tile headers among others. The transforms, for example, that are used for each error could be signaled explicitly, or they could be implicitly determined based on the transforms signaled or derived for all sub-errors with an index lower than the current one. For example, assuming two sub-errors, it could be specified that if the $subError_i$ with i=0 was to use an integer DCT (Discrete Cosine Transform) transform, then for $subError_j$ with j=1 a DST (Discrete Sine Transform) transform would be used instead.

Quantization of each separated transformed sub-error could be specified differently. This permits the user of the encoder to control the quality of each sub-error more flexibly and adjust the quality in areas of importance. Similar to the transform process, the quantization parameters for each transformed sub-error or the relationships between these quantizers could be signaled at different levels of the coding process, including but not only within sequence parameter sets, picture parameter sets, slice/tile headers, or even within blocks (e.g. Coded Tree Unit—CTU, Coded Unit—CU, or transform unit—TU). For example, in the slice header it could be signaled that $subError_1$ will use a quantizer that is larger by a value of 2 compared to the quantizer used for $subError_0$ within the limits of the quantization values supported by the codec. Then at the block level a quantizer is signaled for $subError_0$ that also allows one to determine the quantizer for $subError_1$. A similar process could be used for signaling and determining other quantization related parameters such as quantization matrices. Quantization matrices could be shared or could differ among sub-errors. Such differences could be fixed or could be signaled, e.g. by signaling different matrices for the different sub-errors or by signaling an error or a formulation that allows the derivation of one quantization matrix from the other. For example, the derivation may state that for $subError_1$ the quantization matrix will have values that are 2× for some positions (e.g. the DC coefficient) or for all positions of the values for $subError_0$. Different quantization, e.g. a uniform vs a non-uniform quantization, a deadzone vs a mid-riser quantizer, etc. could also be used for the different sub-errors. Zonal quantization methods could also be used, with potentially different zonal coverage for each sub-error.

Using this process the final error is reconstructed by summing up the different sub-errors together after those are inverse quantized and inverse transformed as follows:

$$reconError = \sum_{i=0}^{N-1} T_i^{-1}(Q_i^{-1}(Q_i(T_i(subError_i))))$$

It is quite possible also that instead of summing without weighting the different subErrors, that such sub-errors are generated through unequal weighted decomposition, such as:

$$Error = \sum_{i=0}^{N-1} a_i \times subError_i \text{ and}$$

$$reconError = \sum_{i=0}^{N-1} a_i \times T_i^{-1}(Q_i^{-1}(Q_i(T_i(subError_i))))$$

Nonlinear decomposition and weighting could also be used. The weighting also could depend on pixel position. For example, it may be decided to decompose errors in a triangular manner. That is, assuming a residual block of size M×M, then all samples that have coordinates (i, j) within that block that satisfy the inequality i+j<M are assigned to $subError_0$. All remaining samples are assigned to $subError_1$. In this manner a triangular or other shaped transform can be constructed. In this example, the values that are outside a corresponding partition are discarded during reconstruction.

The above could be generalized to allow overlapping of sub-errors within a region. For example, the samples that correspond to $subError_0$ are the ones with coordinates that satisfy the inequality i+j<M+2. Equivalently, for $subError_1$ its corresponding samples are the ones that satisfy the inequality i+j>M−2. In this case, samples that are at positions M−2<i+j<M+2 are present in both regions and would need to be summed together during the reconstruction process.

Similar concepts apply not only to the first component of an error, e.g. the luma component, but also other components if present (e.g. chroma u and chroma v components). Such components may be characterized by their own transforms and/or quantizer values. These components could be handled in a similar manner as the first component.

The differences in quantization could be handled in the encoder using also a rate distortion optimization approach where the quantization values for the different subErrors are used to determine one or more Lagrangian multiplier parameters. If one Lagrangian multiplier, its value can be computed by considering both quantization values, e.g. by averaging them or using some other formulation to compute a combined quantization value. Alternatively, one could compute multiple Lagrangian multiplier parameters with each one associated with each separate residual and its corresponding QP. In such a case, Lagrangian optimization could be performed by optimizing/minimizing the criterion J computed as follows:

$$J = D + \sum_{i=0}^{N-1} \lambda_i(Q_i) \times \text{bits}_i$$

The process of generating the sub-errors could be open loop, e.g. each one could be generated independently from the original error value, Error, without considering coding impact on any of the lower indexed residuals. However, in some cases improved performance could be achieved by using a closed loop method where the residuals could be generated by also considering distortion introduced by coding such lower indexed residuals. For example, assuming that we support two sub-errors, $subError_0$ and $subError_1$, $subError_1$ could be generated as follows:

$$subError_1 = Error - T_0^{-1}(Q_0^{-1}(Q_0(T_0(subError_0))))$$

It should be noted that the generation of the residual in this manner has no implications to the decoder design. That remains the same. Only the residual values of $subError_1$ are impacted since now those also contain the impact of the quantization on $subError_0$.

Modifications to other components of the encoding and decoding process that may be affected by the presence of decomposed residuals may also be necessary in different encoders and/or decoders. In particular, commonly deblocking considers the quantization parameter used for the residual for determining the deblocking parameters, e.g. strength parameters, to be used for deblocking the current region. In this scenario all quantization parameters impacting the block would need to be considered. For example, one could consider the sum or weighted sum, the maximum or some other combination of all QPs used for a block.

In another embodiment, in the encoder a rate control scheme would have to also be adapted to consider the possibility of the decomposed residuals and their different quantization parameters. In particular, a model could consider each subError independently and compute appropriate QP parameters for each individual subError. In a different scheme the QPs could be computed while considering the relationships between sub-errors as well as the encoding of earlier subErrors for the current as well as previous subBlocks.

The proposed scheme could be used in a system where all blocks could be coded using transform decomposition with the same number of subErrors, however it might be more efficient to only signal transform decomposition, as well as the number of subErrors for each individual block independently. For example a particular implementation could support blocks with no transform decomposition but also blocks with two subErrors. Identification of such blocks could be done using new parameters at the block level, could be based on block position, or could be based on the transformation indicator that a codec may support. For example, a codec may support for each block a transform_id parameter that indicates the type of transform that is to be used but also if the residual is to be decomposed. For example, if transform_id is set to 0, the normal DCT is applied using one error block. If 1, then the DST is used. If 2, then the residual is decomposed to two subErrors, with the first sub-error coded using the DCT and the second the DST. This could be generalized to support independent transformation of the horizontal and vertical axis. In such a case, for example, the first transform_id (e.g. the horizontal one) indicates both the transform (e.g. DCT and/or DST) but also if the entire residual should be decomposed to N subErrors.

The proposed methods could be applied to image and video compressed data, however they could also be used for the coding of other information that may use a prediction and residual coding process, such as point clouds, light fields, meshes, and even audio signals among others.

Example Computer System

Figure 16:
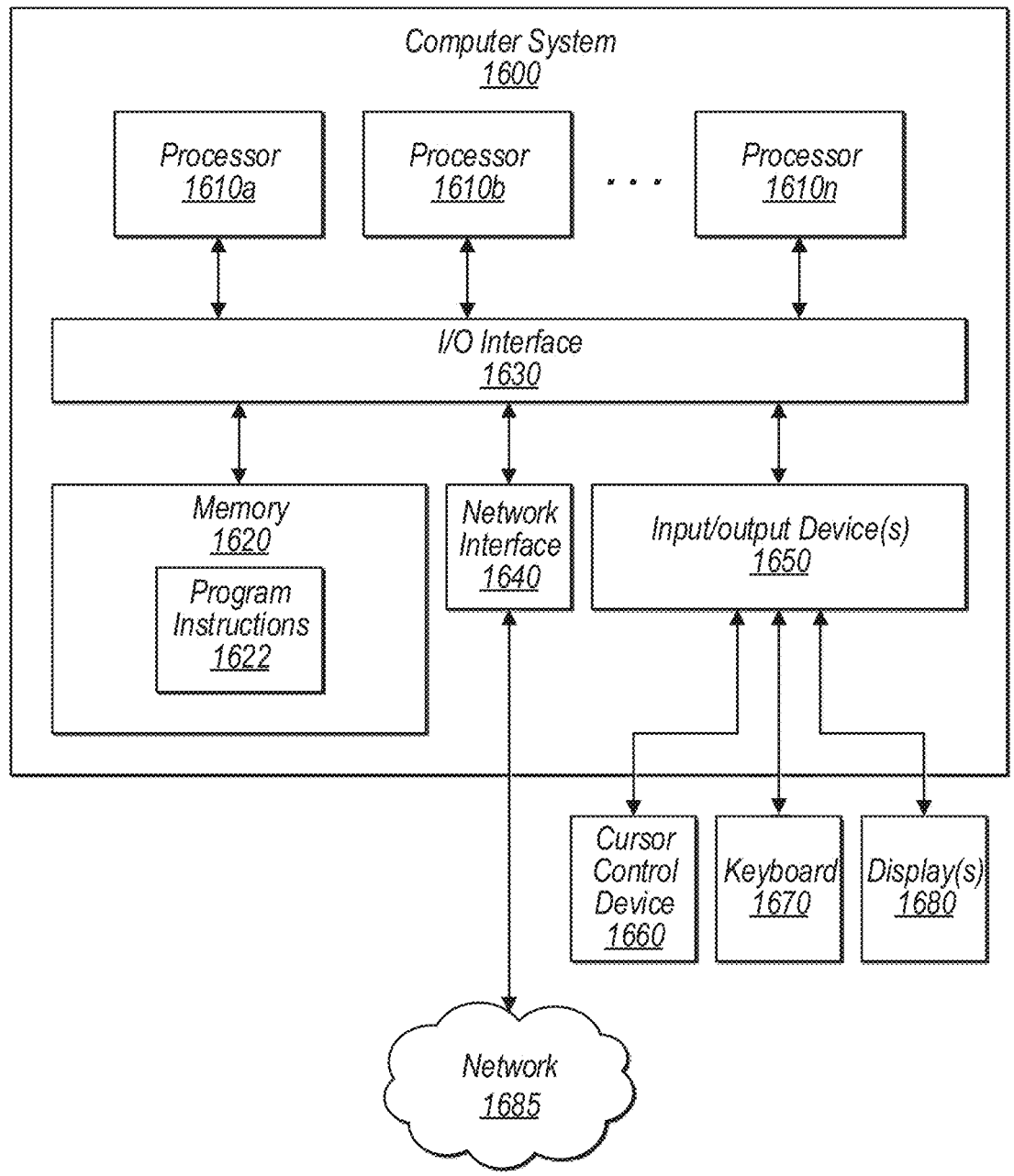
FIG. 16 illustrates an example computer system that may implement an encoder or decoder, according to some embodiments.

FIG. 16 illustrates an example computer system 1600 that may implement an encoder or decoder or any other ones of the components described herein, (e.g., any of the components described above with reference to FIGS. 1-15), in accordance with some embodiments. The computer system 1600 may be configured to execute any or all of the embodiments described above. In different embodiments, computer system 1600 may be any of various types of devices, including, but not limited to, a personal computer system, desktop computer, laptop, notebook, tablet, slate, pad, or netbook computer, mainframe computer system, handheld computer, workstation, network computer, a camera, a set top box, a mobile device, a consumer device, video game console, handheld video game device, application server, storage device, a television, a video recording device, a peripheral device such as a switch, modem, router, or in general any type of computing or electronic device.

Various embodiments of an encoder or decoder, as described herein may be executed in one or more computer systems 1600, which may interact with various other devices. Note that any component, action, or functionality described above with respect to FIGS. 1-15 may be implemented on one or more computers configured as computer system 1600 of FIG. 16, according to various embodiments. In the illustrated embodiment, computer system 1600 includes one or more processors 1610 coupled to a system memory 1620 via an input/output (I/O) interface 1630. Computer system 1600 further includes a network interface 1640 coupled to I/O interface 1630, and one or more input/output devices 1650, such as cursor control device 1660, keyboard 1670, and display(s) 1680. In some cases, it is contemplated that embodiments may be implemented using a single instance of computer system 1600, while in other embodiments multiple such systems, or multiple nodes making up computer system 1600, may be configured to host different portions or instances of embodiments. For example, in one embodiment some elements may be implemented via one or more nodes of computer system 1600 that are distinct from those nodes implementing other elements.

In various embodiments, computer system 1600 may be a uniprocessor system including one processor 1610, or a multiprocessor system including several processors 1610

(e.g., two, four, eight, or another suitable number). Processors 1610 may be any suitable processor capable of executing instructions. For example, in various embodiments processors 1610 may be general-purpose or embedded processors implementing any of a variety of instruction set architectures (ISAs), such as the x86, PowerPC, SPARC, or MIPS ISAs, or any other suitable ISA. In multiprocessor systems, each of processors 1610 may commonly, but not necessarily, implement the same ISA.

System memory 1620 may be configured to store point cloud compression or point cloud decompression program instructions 1622 and/or sensor data accessible by processor 1610. In various embodiments, system memory 1620 may be implemented using any suitable memory technology, such as static random access memory (SRAM), synchronous dynamic RAM (SDRAM), nonvolatile/Flash-type memory, or any other type of memory. In the illustrated embodiment, program instructions 1622 may be configured to implement an image sensor control application incorporating any of the functionality described above. In some embodiments, program instructions and/or data may be received, sent or stored upon different types of computer-accessible media or on similar media separate from system memory 1620 or computer system 1600. While computer system 1600 is described as implementing the functionality of functional blocks of previous Figures, any of the functionality described herein may be implemented via such a computer system.

In one embodiment, I/O interface 1630 may be configured to coordinate I/O traffic between processor 1610, system memory 1620, and any peripheral devices in the device, including network interface 1640 or other peripheral interfaces, such as input/output devices 1650. In some embodiments, I/O interface 1630 may perform any necessary protocol, timing or other data transformations to convert data signals from one component (e.g., system memory 1620) into a format suitable for use by another component (e.g., processor 1610). In some embodiments, I/O interface 1630 may include support for devices attached through various types of peripheral buses, such as a variant of the Peripheral Component Interconnect (PCI) bus standard or the Universal Serial Bus (USB) standard, for example. In some embodiments, the function of I/O interface 1630 may be split into two or more separate components, such as a north bridge and a south bridge, for example. Also, in some embodiments some or all of the functionality of I/O interface 1630, such as an interface to system memory 1620, may be incorporated directly into processor 1610.

Network interface 1640 may be configured to allow data to be exchanged between computer system 1600 and other devices attached to a network 1685 (e.g., carrier or agent devices) or between nodes of computer system 1600. Network 1685 may in various embodiments include one or more networks including but not limited to Local Area Networks (LANs) (e.g., an Ethernet or corporate network), Wide Area Networks (WANs) (e.g., the Internet), wireless data networks, some other electronic data network, or some combination thereof. In various embodiments, network interface 1640 may support communication via wired or wireless general data networks, such as any suitable type of Ethernet network, for example; via telecommunications/telephony networks such as analog voice networks or digital fiber communications networks; via storage area networks such as Fibre Channel SANs, or via any other suitable type of network and/or protocol.

Input/output devices 1650 may, in some embodiments, include one or more display terminals, keyboards, keypads, touchpads, scanning devices, voice or optical recognition devices, or any other devices suitable for entering or accessing data by one or more computer systems 1600. Multiple input/output devices 1650 may be present in computer system 1600 or may be distributed on various nodes of computer system 1600. In some embodiments, similar input/output devices may be separate from computer system 1600 and may interact with one or more nodes of computer system 1600 through a wired or wireless connection, such as over network interface 1640.

As shown in FIG. 16, memory 1620 may include program instructions 1622, which may be processor-executable to implement any element or action described above. In one embodiment, the program instructions may implement the methods described above. In other embodiments, different elements and data may be included. Note that data may include any data or information described above.

Those skilled in the art will appreciate that computer system 1600 is merely illustrative and is not intended to limit the scope of embodiments. In particular, the computer system and devices may include any combination of hardware or software that can perform the indicated functions, including computers, network devices, Internet appliances, PDAs, wireless phones, pagers, etc. Computer system 1600 may also be connected to other devices that are not illustrated, or instead may operate as a stand-alone system. In addition, the functionality provided by the illustrated components may in some embodiments be combined in fewer components or distributed in additional components. Similarly, in some embodiments, the functionality of some of the illustrated components may not be provided and/or other additional functionality may be available.

Those skilled in the art will also appreciate that, while various items are illustrated as being stored in memory or on storage while being used, these items or portions of them may be transferred between memory and other storage devices for purposes of memory management and data integrity. Alternatively, in other embodiments some or all of the software components may execute in memory on another device and communicate with the illustrated computer system via inter-computer communication. Some or all of the system components or data structures may also be stored (e.g., as instructions or structured data) on a computer-accessible medium or a portable article to be read by an appropriate drive, various examples of which are described above. In some embodiments, instructions stored on a computer-accessible medium separate from computer system 1600 may be transmitted to computer system 1600 via transmission media or signals such as electrical, electromagnetic, or digital signals, conveyed via a communication medium such as a network and/or a wireless link. Various embodiments may further include receiving, sending or storing instructions and/or data implemented in accordance with the foregoing description upon a computer-accessible medium. Generally speaking, a computer-accessible medium may include a non-transitory, computer-readable storage medium or memory medium such as magnetic or optical media, e.g., disk or DVD/CD-ROM, volatile or non-volatile media such as RAM (e.g. SDRAM, DDR, RDRAM, SRAM, etc.), ROM, etc. In some embodiments, a computer-accessible medium may include transmission media or signals such as electrical, electromagnetic, or digital signals, conveyed via a communication medium such as network and/or a wireless link The methods described herein may be implemented in software, hardware, or a combination thereof, in different embodiments. In addition, the order of the blocks of the methods may be changed, and various elements may be added, reordered, combined, omitted, modified, etc. Various modifications and changes may be made as would be obvious to a person skilled in the art having the benefit of this disclosure. The various embodiments described herein are meant to be illustrative and not limiting. Many variations, modifications, additions, and improvements are possible. Accordingly, plural instances may be provided for components described herein as a single instance. Boundaries between various components, operations and data stores are somewhat arbitrary, and particular operations are illustrated in the context of specific illustrative configurations. Other allocations of functionality are envisioned and may fall within the scope of claims that follow. Finally, structures and functionality presented as discrete components in the example configurations may be implemented as a combined structure or component. These and other variations, modifications, additions, and improvements may fall within the scope of embodiments as defined in the claims that follow.

What is claimed is:

1. A method for encoding video image data, comprising:
    compressing pixel value data for an image included in a frame of a video, including:
        for respective blocks of a plurality of blocks of the image:
            determining a plurality of sets of sub-errors for pixel values of pixels of the block;
            applying a first set of processing parameters to a first set of the sets of sub-errors to modify the first set of sub-errors in accordance with the first set of processing parameters;
            applying a second set of processing parameters to a second set of the sets of sub-errors to modify the second set of sub-errors in accordance with the second set of processing parameters,
            wherein at least one processing parameter in the second set of processing parameters is different from processing parameters in the first set of processing parameters; and
            wherein at least one of the first and second sets of processing parameters are selected such that:
                distortion of at least one of the first and second sets of sub-errors is reduced as compared to applying other combinations of the first and second sets of processing parameters to the first and second sets of sub-errors; or
                compression efficiency of at least one of the first and second sub-errors is increased as compared to applying other combinations of the first and second sets of processing parameters to the first and second sets of sub-errors; and
    encoding compressed pixel value data for the image of the video, wherein encoding the compressed pixel value data comprises encoding the first modified set of sub-errors separate from the second modified set of sub-errors.

2. The method of claim 1, wherein applying the first set of processing parameters to the first set of sub-errors comprises:
    applying a first transformation to the first set of sub-errors and quantize a transformed version of the first set of sub-errors according to a first set of quantization parameters; and
    wherein applying the second set of processing parameters to the second set of sub-errors comprises:
        applying a second transformation to the second set of sub-errors and quantize a transformed version of the second set of sub-errors according to a second set of quantization parameters, and
    wherein:
        the first and second transformations are different transformations,
        the first and second set of quantization parameters are different quantization parameters, or
        both the first and second transformations are different transformations and the first and second set of quantization parameters are different quantization parameters.

3. The method of claim 1, wherein the plurality of sets of sub-errors are determined based, at least in part, on one or more of:
    differences in textures in portions of the block;
    edges between objects depicted in the block; or
    color differences between regions of the block.

4. The method of claim 1, wherein compressing the pixel value data comprises:
    determining one or more weighting factors for one or more sets of the plurality of sub-errors,
    wherein the one or more weighting factors are determined based on a rate distortion optimization (RDO) calculation or are determined based on a Lagrangian multiplier optimization calculation.

5. The method of claim 1, wherein compressing the pixel value data comprises:
    applying an inverse of the first set of processing parameters to the first set of sub-errors;
    applying an inverse of the second set of processing parameters to the second set of sub-errors;
    summing the first and second set of sub-errors after applying the respective first and second set of inverse processing parameters;
    applying the summed sub-errors to predicted pixel values for the block;
    determining distortion or artifacts in resulting pixel values of the block after applying the summed sub-errors; and
    adjusting the first or the second set of processing parameters based on the determined distortion or artifacts.

6. The method of claim 1, wherein encoding the compressed pixel value data for the image comprises:
    including one or more index values in the compressed pixel value data, wherein the one or more index values indicate the first set of processing parameters and the second set of processing parameters.

7. The method of claim 1, wherein encoding the compressed pixel value data for the image comprises:
    signaling global values for the first or second set of processing parameters for a group of the image frames or for a particular image frame; and
    signaling particular values for the first or second set of processing parameters for a block or a slice of a block within an image frame.

8. The method of claim 1, comprising:
    receiving user input selecting portions of the plurality of images to be processed differently than other portions of the plurality of images during compression,
    wherein the plurality of sets of sub-errors are determined based, at least in part, on user input received via a user interface.

9. The method of claim 8, wherein at least one of the selected portions overlaps with another portion of the image, the method comprising:
reconstructing the image by:
adding sub-errors for a first portion of the image to predicted pixel values for the first portion of the image;
adding sub-errors for a second portion of the image to predicted pixel values for the second portion of the image; and
adding sub-errors for the first portion of the image and sub-errors for the second portion of the image to predicted pixel values for an overlap portion of the image, wherein the first portion and the second portion overlap one another in the overlap portion.

10. The method of claim 1, wherein applying the first set of processing parameters to the first set of sub-errors comprises:
applying a first transformation to the first set of sub-errors and quantize a transformed version of the first set of sub-errors according to a first set of quantization parameters; and
wherein applying the second set of processing parameters to the second set of sub-errors comprises:
applying a second transformation to the second set of sub-errors and quantize a transformed version of the second set of sub-errors according to a second set of quantization parameters; and
wherein to the method comprises:
applying the first transformation, the second transformation, or one or more other transformations to one or more other sets of sub-errors; and
quantizing transformed versions of the one or more other sets of sub-errors,
wherein the quantization parameters to be used to quantize the transformed version of the first set of sub-errors, the transformed version of the second set of sub-errors, and the one or more other transformed versions of the one or more other sets of sub-errors are defined by one or more quantization matrices,
wherein the compressed pixel value data for the plurality of images indicates one or more quantization matrices stored by a decoder that are to be used to perform an inverse quantization for the first, second, or one or more other sets of sub-errors.

11. A method for decoding video image data, comprising:
receiving compressed data for an image of a video, wherein the compressed data comprises a first set of modified sub-errors and a second set of modified sub-errors for respective blocks of the image, wherein the first set of modified sub-errors is encoded separate from the second set of modified sub-errors, the first and second sets of modified sub-errors having been modified by respective first and second sets of processing parameters, at least one of the first and second sets of processing parameters having been selected such that:
distortion of a residual differences signal is reduced as compared to application of other combinations of the first and second sets of processing parameters; or
compression efficiency of the residual differences signal is increased as compared to application of other combinations of the first and second sets of processing parameters;
for respective blocks of the image:
applying a first set of inverse processing parameters to a first set of modified sub-errors for the block to produce a first set of sub-errors;
applying a second set of inverse processing parameters to the second set of modified sub-errors for the block to produce a second set of sub-errors, wherein at least one inverse processing parameter in the second set of inverse processing parameters is different from inverse processing parameters in the first set of inverse processing parameters; and
adding the first and second sets of sub-errors to predicted values for the block; and
reconstructing the image from the respective blocks to which the first and second sets of sub-errors have been added to the predicted values.

12. The method of claim 11, wherein the compressed data comprises one or more index values into an index of inverse processing parameters, and wherein the method comprises:
looking-up the first set of inverse processing parameters in the index based on an index value included with the compressed data; and
looking-up the second set of inverse processing parameters in the index based on the index value or another index value included with the compressed data.

13. The method of claim 11, wherein applying the first set of inverse processing parameters to the first modified set of sub-errors comprises:
applying an inverse quantization to the first set of modified sub-errors; and
applying an inverse transformation to the first set of modified sub-errors to which the inverse quantization has been applied; and
wherein applying the second set of inverse processing parameters to the second modified set of sub-errors comprises:
applying another inverse quantization to the second set of modified sub-errors; and
applying another inverse transformation to the second set of modified sub-errors to which the inverse quantization has been applied.

14. The method of claim 11, wherein the compressed data indicates one or more quantization matrices to be used to perform an inverse quantization for the first, second, or a plurality of other sets of sub-errors, and
wherein the method comprises determining quantization parameters to be used in applying inverse quantizations to the first, second, or other sets of sub-errors based on the indicated one or more quantization matrices.

15. The method of claim 11, comprising:
rendering the reconstructed image to be displayed on a display.

16. The method of claim 11, wherein the compressed data comprises:
data indicating inverse processing parameters for the first and second sets of sub-errors to be applied for a group of images or for a full image; and
data indicating particular inverse processing parameters for the first or second set of sub-errors to be applied to particular portions of one or more images of the group of images or to be applied to a particular portion of the full image,
wherein the method comprises:
applying the inverse processing parameters to the group of images or the full image other than the particular portions of the one or more images of the group of images or the particular portion of the full image; and applying the particular inverse processing parameters to the particular portions of the one or more images of the group of images or to the particular portion of the full image.

17. The method of claim 16, wherein the inverse processing parameters are signaled in a header for the group of images or a header for the full image.

18. The method of claim 16, wherein the particular inverse processing parameters are signaled at a coding tree unit level, prediction unit level, or transform unit level.

19. A system for decoding video image data, comprising:
one or more processors; and
one or more storage devices storing instructions executable by the one or more processors to perform operations comprising:
receiving compressed data for an image of a video, wherein the compressed data comprises a first set of modified sub-errors and a second set of modified sub-errors for respective blocks of the image, wherein the first set of modified sub-errors is encoded separate from the second set of modified sub-errors, the first and second sets of modified sub-errors having been modified by respective first and second sets of processing parameters, wherein at least one of the first and second sets of processing parameters having been selected such that:
distortion of a residual differences signal is reduced as compared to application of other combinations of the first and second sets of processing parameters; or
compression efficiency of the residual differences signal is increased as compared to application of other combinations of the first and second sets of processing parameters;
for respective blocks of the image:
applying a first set of inverse processing parameters to a first set of modified sub-errors for the block to produce a first set of sub-errors;
applying a second set of inverse processing parameters to the second set of modified sub-errors for the block to produce a second set of sub-errors, wherein at least one inverse processing parameter in the second set of inverse processing parameters is different from inverse processing parameters in the first set of inverse processing parameters; and
adding the first and second sets of sub-errors to predicted values for the block; and
reconstructing the image from the respective blocks to which the first and second sets of sub-errors have been added to the predicted values.

* * * * *